US011301646B2

(12) United States Patent
Ackley et al.

(10) Patent No.: US 11,301,646 B2
(45) Date of Patent: Apr. 12, 2022

(54) METHODS, APPARATUSES, AND SYSTEMS FOR PROVIDING PRINT QUALITY FEEDBACK AND CONTROLLING PRINT QUALITY OF MACHINE READABLE INDICIA

(71) Applicant: Datamax-O'Neil Corporation, Altamonte Springs, FL (US)

(72) Inventors: H Sprague Ackley, Seattle, WA (US); Thomas Axel Jonas Celinder, Singapore (SG)

(73) Assignee: DATAMAX-O'NEIL CORPORATION, Altamonte Springs, FL (US)

( * ) Notice: Subject to any disclaimer, the term of this patent is extended or adjusted under 35 U.S.C. 154(b) by 0 days.

(21) Appl. No.: 16/688,197

(22) Filed: Nov. 19, 2019

(65) Prior Publication Data
US 2020/0082131 A1 Mar. 12, 2020

Related U.S. Application Data

(63) Continuation of application No. 16/240,109, filed on Jan. 4, 2019, now Pat. No. 10,546,160.
(Continued)

(51) Int. Cl.
*G06K 5/02* (2006.01)
*H04N 1/00* (2006.01)
(Continued)

(52) U.S. Cl.
CPC .................. *G06K 5/02* (2013.01);
*B41J 3/01* (2013.01); *B41J 3/4075* (2013.01);
(Continued)

(58) Field of Classification Search
CPC .. G06K 5/02; B41J 3/4075; B41J 3/01; H04N 1/00015; H04N 1/00029; H04N 1/00076;
(Continued)

(56) References Cited

U.S. PATENT DOCUMENTS

| 5,051,567 A | 9/1991 | Tedesco |
| 5,218,190 A | 6/1993 | Hardesty et al. |

(Continued)

FOREIGN PATENT DOCUMENTS

| EP | 2270746 | 1/2011 |
| EP | 3336770 | 6/2018 |

(Continued)

OTHER PUBLICATIONS

US 8,548,242 B1, 10/2013, Longacre (withdrawn)
(Continued)

*Primary Examiner* — Laura A Gudorf
(74) *Attorney, Agent, or Firm* — Alston & Bird LLP

(57) ABSTRACT

A printer-verifier system for providing print quality feedback and controlling print quality is provided. The printer-verifier system may include a printing mechanism configured to print a machine-readable indicia on a print media; a verifier device configured to optically scan the machine-readable indicia; and a print quality monitoring device in electronic communication with the printing mechanism and the verifier device.

20 Claims, 22 Drawing Sheets

Related U.S. Application Data

(60) Provisional application No. 62/614,089, filed on Jan. 5, 2018.

(51) Int. Cl.
    *B41J 3/407*     (2006.01)
    *B41J 3/01*     (2006.01)
    *H04N 1/32*     (2006.01)

(52) U.S. Cl.
    CPC ..... *H04N 1/00015* (2013.01); *H04N 1/00029* (2013.01); *H04N 1/00076* (2013.01); *H04N 1/00331* (2013.01); *H04N 1/00334* (2013.01); *H04N 1/00363* (2013.01); *H04N 1/32144* (2013.01)

(58) Field of Classification Search
    CPC ........... H04N 1/00331; H04N 1/00334; H04N 1/00363; H04N 1/32144
    See application file for complete search history.

(56) References Cited

U.S. PATENT DOCUMENTS

| | | | |
|---|---|---|---|
| 5,272,322 | A | 12/1993 | Nishida et al. |
| 5,318,938 | A | 6/1994 | Hampl et al. |
| 5,488,223 | A | 1/1996 | Austin et al. |
| 5,488,233 | A | 1/1996 | Ishikawa et al. |
| 5,521,368 | A | 5/1996 | Adachi |
| 5,564,841 | A * | 10/1996 | Austin ............. B41J 2/36 347/188 |
| 5,761,336 | A | 6/1998 | Xu et al. |
| 5,914,474 | A | 6/1999 | Spitz |
| 6,036,091 | A | 3/2000 | Spitz |
| 6,323,949 | B1 | 11/2001 | Lading et al. |
| 6,511,141 | B1 | 1/2003 | Hasegawa et al. |
| 6,535,299 | B1 | 3/2003 | Scherz |
| 6,567,530 | B1 | 5/2003 | Keronen et al. |
| 6,741,727 | B1 | 5/2004 | Hirasawa |
| 6,832,725 | B2 | 12/2004 | Gardiner et al. |
| 6,997,627 | B2 | 2/2006 | Chiu |
| 7,128,266 | B2 | 10/2006 | Zhu et al. |
| 7,159,783 | B2 | 1/2007 | Walczyk et al. |
| 7,413,127 | B2 | 8/2008 | Ehrhart et al. |
| 7,440,123 | B2 | 10/2008 | Chodagiri et al. |
| 7,471,331 | B2 | 12/2008 | Kaneda |
| 7,570,788 | B2 | 8/2009 | Tsukamoto et al. |
| 7,600,687 | B2 | 10/2009 | Biss et al. |
| 7,726,575 | B2 | 6/2010 | Wang et al. |
| 7,869,112 | B2 | 1/2011 | Borchers et al. |
| 7,877,004 | B2 | 1/2011 | Maruyama et al. |
| 7,920,283 | B2 | 4/2011 | Shimazaki |
| 7,936,365 | B2 | 5/2011 | Jeong |
| 8,269,836 | B2 | 9/2012 | Zandifar et al. |
| 8,294,945 | B2 | 10/2012 | Natori |
| 8,294,969 | B2 | 10/2012 | Plesko |
| 8,317,105 | B2 | 11/2012 | Kotlarsky et al. |
| 8,322,622 | B2 | 12/2012 | Liu |
| 8,355,058 | B2 | 1/2013 | Shirai |
| 8,366,005 | B2 | 2/2013 | Kotlarsky et al. |
| 8,371,507 | B2 | 2/2013 | Haggerty et al. |
| 8,376,233 | B2 | 2/2013 | Horn et al. |
| 8,381,979 | B2 | 2/2013 | Franz |
| 8,390,909 | B2 | 3/2013 | Plesko |
| 8,408,464 | B2 | 4/2013 | Zhu et al. |
| 8,408,468 | B2 | 4/2013 | Van et al. |
| 8,408,469 | B2 | 4/2013 | Good |
| 8,424,768 | B2 | 4/2013 | Rueblinger et al. |
| 8,448,863 | B2 | 5/2013 | Xian et al. |
| 8,457,013 | B2 | 6/2013 | Essinger et al. |
| 8,459,557 | B2 | 6/2013 | Havens et al. |
| 8,469,272 | B2 | 6/2013 | Kearney |
| 8,474,712 | B2 | 7/2013 | Kearney et al. |
| 8,479,992 | B2 | 7/2013 | Kotlarsky et al. |
| 8,482,809 | B2 | 7/2013 | Mikami |
| 8,488,181 | B2 | 7/2013 | Wu et al. |
| 8,490,877 | B2 | 7/2013 | Kearney |
| 8,517,271 | B2 | 8/2013 | Kotlarsky et al. |
| 8,523,076 | B2 | 9/2013 | Good |
| 8,528,818 | B2 | 9/2013 | Ehrhart et al. |
| 8,544,737 | B2 | 10/2013 | Gomez et al. |
| 8,548,420 | B2 | 10/2013 | Grunow et al. |
| 8,550,335 | B2 | 10/2013 | Samek et al. |
| 8,550,354 | B2 | 10/2013 | Gannon et al. |
| 8,550,357 | B2 | 10/2013 | Kearney |
| 8,556,174 | B2 | 10/2013 | Kosecki et al. |
| 8,556,176 | B2 | 10/2013 | Van et al. |
| 8,556,177 | B2 | 10/2013 | Hussey et al. |
| 8,559,767 | B2 | 10/2013 | Barber et al. |
| 8,561,895 | B2 | 10/2013 | Gomez et al. |
| 8,561,903 | B2 | 10/2013 | Sauerwein, Jr. |
| 8,561,905 | B2 | 10/2013 | Edmonds et al. |
| 8,565,107 | B2 | 10/2013 | Pease et al. |
| 8,571,307 | B2 | 10/2013 | Li et al. |
| 8,579,200 | B2 | 11/2013 | Samek et al. |
| 8,583,924 | B2 | 11/2013 | Caballero et al. |
| 8,584,945 | B2 | 11/2013 | Wang et al. |
| 8,587,595 | B2 | 11/2013 | Wang |
| 8,587,697 | B2 | 11/2013 | Hussey et al. |
| 8,588,869 | B2 | 11/2013 | Sauerwein et al. |
| 8,590,789 | B2 | 11/2013 | Nahill et al. |
| 8,596,539 | B2 | 12/2013 | Havens et al. |
| 8,596,542 | B2 | 12/2013 | Havens et al. |
| 8,596,543 | B2 | 12/2013 | Havens et al. |
| 8,599,271 | B2 | 12/2013 | Havens et al. |
| 8,599,957 | B2 | 12/2013 | Peake et al. |
| 8,600,158 | B2 | 12/2013 | Li et al. |
| 8,600,167 | B2 | 12/2013 | Showering |
| 8,602,309 | B2 | 12/2013 | Longacre et al. |
| 8,608,053 | B2 | 12/2013 | Meier et al. |
| 8,608,071 | B2 | 12/2013 | Liu et al. |
| 8,611,309 | B2 | 12/2013 | Wang et al. |
| 8,615,487 | B2 | 12/2013 | Gomez et al. |
| 8,621,123 | B2 | 12/2013 | Caballero |
| 8,622,303 | B2 | 1/2014 | Meier et al. |
| 8,628,013 | B2 | 1/2014 | Ding |
| 8,628,015 | B2 | 1/2014 | Wang et al. |
| 8,628,016 | B2 | 1/2014 | Winegar |
| 8,629,926 | B2 | 1/2014 | Wang |
| 8,630,030 | B2 | 1/2014 | Chung et al. |
| 8,630,491 | B2 | 1/2014 | Longacre et al. |
| 8,635,309 | B2 | 1/2014 | Berthiaume et al. |
| 8,636,200 | B2 | 1/2014 | Kearney |
| 8,636,212 | B2 | 1/2014 | Nahill et al. |
| 8,636,215 | B2 | 1/2014 | Ding et al. |
| 8,636,224 | B2 | 1/2014 | Wang |
| 8,638,806 | B2 | 1/2014 | Wang et al. |
| 8,640,958 | B2 | 2/2014 | Lu et al. |
| 8,640,960 | B2 | 2/2014 | Wang et al. |
| 8,643,717 | B2 | 2/2014 | Li et al. |
| 8,646,692 | B2 | 2/2014 | Meier et al. |
| 8,646,694 | B2 | 2/2014 | Wang et al. |
| 8,657,200 | B2 | 2/2014 | Ren et al. |
| 8,659,397 | B2 | 2/2014 | Vargo et al. |
| 8,668,149 | B2 | 3/2014 | Good |
| 8,675,266 | B2 | 3/2014 | Watts |
| 8,678,285 | B2 | 3/2014 | Kearney |
| 8,678,286 | B2 | 3/2014 | Smith et al. |
| 8,682,077 | B1 | 3/2014 | Longacre, Jr. |
| D702,237 | S | 4/2014 | Oberpriller et al. |
| 8,687,282 | B2 | 4/2014 | Feng et al. |
| 8,692,927 | B2 | 4/2014 | Pease et al. |
| 8,695,880 | B2 | 4/2014 | Bremer et al. |
| 8,698,949 | B2 | 4/2014 | Grunow et al. |
| 8,717,494 | B2 | 5/2014 | Gannon |
| 8,720,783 | B2 | 5/2014 | Biss et al. |
| 8,723,804 | B2 | 5/2014 | Fletcher et al. |
| 8,723,904 | B2 | 5/2014 | Marty et al. |
| 8,727,223 | B2 | 5/2014 | Wang |
| 8,736,914 | B2 | 5/2014 | French |
| 8,740,082 | B2 | 6/2014 | Wilz, Sr. |
| 8,740,085 | B2 | 6/2014 | Furlong et al. |
| 8,746,563 | B2 | 6/2014 | Hennick et al. |
| 8,750,445 | B2 | 6/2014 | Peake et al. |

(56) References Cited

U.S. PATENT DOCUMENTS

| | | |
|---|---|---|
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,768,102 B1 | 7/2014 | Ng et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue et al. |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,085 B2 | 11/2014 | Vandemark et al. |
| 8,879,639 B2 | 11/2014 | Sauerwein, Jr. |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | El et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,037 B1 | 5/2015 | Rudin et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| 9,041,762 B2 | 5/2015 | Bai et al. |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber et al. |
| 9,047,531 B2 | 6/2015 | Showering et al. |
| 9,053,055 B2 | 6/2015 | Caballero |
| 9,053,378 B1 | 6/2015 | Hou et al. |
| 9,053,380 B2 | 6/2015 | Xian et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,171,539 B2 | 10/2015 | Funyak et al. |
| 9,174,457 B1 | 11/2015 | Aihara et al. |
| 9,224,022 B2 | 12/2015 | Ackley et al. |
| 9,224,027 B2 | 12/2015 | Van et al. |
| D747,321 S | 1/2016 | London et al. |
| 9,230,140 B1 | 1/2016 | Ackley |
| 9,250,712 B1 | 2/2016 | Todeschini |
| 9,258,033 B2 | 2/2016 | Showering |
| 9,261,398 B2 | 2/2016 | Amundsen et al. |
| 9,262,633 B1 | 2/2016 | Todeschini et al. |
| 9,262,662 B2 | 2/2016 | Chen et al. |
| 9,262,664 B2 | 2/2016 | Soule et al. |
| 9,274,806 B2 | 3/2016 | Barten |
| 9,282,501 B2 | 3/2016 | Wang et al. |
| 9,292,969 B2 | 3/2016 | Laffargue et al. |
| 9,298,667 B2 | 3/2016 | Caballero |
| 9,310,609 B2 | 4/2016 | Rueblinger et al. |
| 9,319,548 B2 | 4/2016 | Showering et al. |
| D757,009 S | 5/2016 | Oberpriller et al. |
| 9,342,724 B2 | 5/2016 | McCloskey et al. |
| 9,342,827 B2 | 5/2016 | Smith |
| 9,355,294 B2 | 5/2016 | Smith et al. |
| 9,361,536 B1 | 6/2016 | Howe et al. |
| 9,367,722 B2 | 6/2016 | Xian et al. |
| 9,373,018 B2 | 6/2016 | Colavito et al. |
| 9,375,945 B1 | 6/2016 | Bowles |
| D760,719 S | 7/2016 | Zhou et al. |
| 9,390,596 B1 | 7/2016 | Todeschini |
| 9,396,375 B2 | 7/2016 | Qu et al. |
| 9,398,008 B2 | 7/2016 | Todeschini et al. |
| D762,604 S | 8/2016 | Fitch et al. |
| D762,647 S | 8/2016 | Fitch et al. |
| 9,405,011 B2 | 8/2016 | Showering |
| 9,407,840 B2 | 8/2016 | Wang |
| 9,412,242 B2 | 8/2016 | Van et al. |
| 9,418,252 B2 | 8/2016 | Nahill et al. |
| D766,244 S | 9/2016 | Zhou et al. |
| 9,443,123 B2 | 9/2016 | Hejl |
| 9,443,222 B2 | 9/2016 | Singel et al. |
| 9,448,610 B2 | 9/2016 | Davis et al. |

(56) References Cited

U.S. PATENT DOCUMENTS

| | | |
|---|---|---|
| 9,478,113 B2 | 10/2016 | Xie et al. |
| D771,631 S | 11/2016 | Fitch et al. |
| 9,507,974 B1 | 11/2016 | Todeschini |
| D777,166 S | 1/2017 | Bidwell et al. |
| 9,557,166 B2 | 1/2017 | Thuries et al. |
| 9,564,035 B2 | 2/2017 | Ackley et al. |
| 9,569,837 B2 | 2/2017 | Madden et al. |
| 9,582,696 B2 | 2/2017 | Barber et al. |
| D783,601 S | 4/2017 | Schulte et al. |
| 9,616,749 B2 | 4/2017 | Chamberlin |
| 9,618,993 B2 | 4/2017 | Murawski et al. |
| D785,617 S | 5/2017 | Bidwell et al. |
| D785,636 S | 5/2017 | Oberpriller et al. |
| 9,641,700 B2 | 5/2017 | Schumann et al. |
| 9,646,200 B2 | 5/2017 | Archibald et al. |
| 9,659,183 B2 | 5/2017 | Zhu et al. |
| 9,659,670 B2 | 5/2017 | Choi et al. |
| 9,665,757 B2 | 5/2017 | Feng et al. |
| D790,505 S | 6/2017 | Vargo et al. |
| D790,546 S | 6/2017 | Zhou et al. |
| D790,553 S | 6/2017 | Fitch et al. |
| 9,712,758 B2 | 7/2017 | Noda |
| 9,715,614 B2 | 7/2017 | Todeschini et al. |
| 9,734,493 B2 | 8/2017 | Gomez et al. |
| 9,752,864 B2 | 9/2017 | Laffargue et al. |
| 9,762,793 B2 | 9/2017 | Ackley et al. |
| 9,767,581 B2 | 9/2017 | Todeschini |
| 9,786,101 B2 | 10/2017 | Ackley |
| 9,794,392 B2 | 10/2017 | Hejl |
| 9,823,059 B2 | 11/2017 | Li et al. |
| 9,826,106 B2 | 11/2017 | Ackley |
| 9,852,102 B2 | 12/2017 | Kohtz et al. |
| 9,857,167 B2 | 1/2018 | Jovanovski et al. |
| 9,861,182 B2 | 1/2018 | Oberpriller et al. |
| 9,891,612 B2 | 2/2018 | Charpentier et al. |
| 9,892,876 B2 | 2/2018 | Bandringa |
| 9,897,434 B2 | 2/2018 | Ackley et al. |
| 9,898,814 B2 | 2/2018 | Kitai et al. |
| 9,924,006 B2 | 3/2018 | Schoon et al. |
| 9,930,050 B2 | 3/2018 | Yeakley et al. |
| 9,954,871 B2 | 4/2018 | Hussey et al. |
| 9,978,088 B2 | 5/2018 | Pape |
| 9,984,685 B2 | 5/2018 | Braho et al. |
| 10,007,112 B2 | 6/2018 | Fitch et al. |
| 10,019,334 B2 | 7/2018 | Caballero et al. |
| 10,021,043 B2 | 7/2018 | Sevier |
| 10,038,716 B2 | 7/2018 | Todeschini et al. |
| 10,060,729 B2 | 8/2018 | Laffargue et al. |
| 10,066,982 B2 | 9/2018 | Ackley et al. |
| 10,121,466 B2 | 11/2018 | Pecorari |
| 10,139,495 B2 | 11/2018 | Payne |
| 10,195,880 B2 | 2/2019 | D'Armancourt |
| 10,269,342 B2 | 4/2019 | Braho et al. |
| 10,427,424 B2 | 10/2019 | Creencia et al. |
| 10,546,160 B2 | 1/2020 | Sprague et al. |
| 10,552,848 B2 | 2/2020 | Soborski |
| 10,628,723 B2 | 4/2020 | D'Armancourt et al. |
| 10,672,588 B1 | 6/2020 | Pathangi et al. |
| 2001/0016054 A1 | 8/2001 | Banker et al. |
| 2001/0035971 A1 | 11/2001 | Koakutsu et al. |
| 2004/0029068 A1 | 2/2004 | Sachdeva et al. |
| 2004/0033098 A1 | 2/2004 | Chiu |
| 2004/0036089 A1 | 2/2004 | Chen |
| 2004/0057768 A1 | 3/2004 | Oshino et al. |
| 2004/0120569 A1 | 6/2004 | Hung et al. |
| 2005/0105104 A1 | 5/2005 | Sakai et al. |
| 2006/0012664 A1 | 1/2006 | Jeong |
| 2006/0039690 A1 | 2/2006 | Steinberg et al. |
| 2006/0197795 A1 | 9/2006 | Takatsuka et al. |
| 2006/0269342 A1 | 11/2006 | Yoshida et al. |
| 2007/0146755 A1 | 6/2007 | Mindler et al. |
| 2007/0195337 A1 | 8/2007 | Takayama et al. |
| 2008/0144080 A1 * | 6/2008 | Randt .................... G06F 3/126 358/1.15 |
| 2008/0185432 A1 | 8/2008 | Caballero et al. |
| 2008/0218551 A1 | 9/2008 | Inaba |
| 2009/0002749 A1 | 1/2009 | Koyano |
| 2009/0058348 A1 | 3/2009 | Ryu |
| 2009/0085952 A1 | 4/2009 | Yamazaki |
| 2009/0087022 A1 | 4/2009 | Fukuda et al. |
| 2009/0134221 A1 | 5/2009 | Zhu et al. |
| 2009/0316161 A1 | 12/2009 | Yamaguchi et al. |
| 2010/0165022 A1 | 7/2010 | Makuta et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0188714 A1 | 7/2010 | Yamakawa |
| 2010/0265880 A1 | 10/2010 | Rautiola et al. |
| 2011/0102850 A1 | 5/2011 | Watanabe |
| 2011/0202554 A1 | 8/2011 | Powilleit et al. |
| 2011/0292435 A1 | 12/2011 | Cok et al. |
| 2012/0085823 A1 | 4/2012 | Nakamura |
| 2012/0111946 A1 | 5/2012 | Golant |
| 2012/0168511 A1 | 7/2012 | Kotlarsky et al. |
| 2012/0168512 A1 | 7/2012 | Kotlarsky et al. |
| 2012/0182374 A1 | 7/2012 | Matsuda et al. |
| 2012/0182571 A1 | 7/2012 | Wu et al. |
| 2012/0193423 A1 | 8/2012 | Samek |
| 2012/0203647 A1 | 8/2012 | Smith |
| 2012/0223141 A1 | 9/2012 | Good et al. |
| 2012/0228382 A1 | 9/2012 | Havens et al. |
| 2012/0248188 A1 | 10/2012 | Kearney |
| 2012/0263483 A1 | 10/2012 | Suzuki |
| 2012/0330447 A1 | 12/2012 | Gerlach et al. |
| 2013/0038670 A1 | 2/2013 | Chen |
| 2013/0043312 A1 | 2/2013 | Van Horn |
| 2013/0082104 A1 | 4/2013 | Kearney et al. |
| 2013/0148987 A1 | 6/2013 | Arakawa |
| 2013/0175341 A1 | 7/2013 | Kearney et al. |
| 2013/0175343 A1 | 7/2013 | Good |
| 2013/0250369 A1 | 9/2013 | Kitai et al. |
| 2013/0250370 A1 | 9/2013 | Kojima et al. |
| 2013/0257744 A1 | 10/2013 | Daghigh et al. |
| 2013/0257759 A1 | 10/2013 | Daghigh |
| 2013/0258368 A1 | 10/2013 | Shigemoto et al. |
| 2013/0259301 A1 | 10/2013 | Chen et al. |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedrao |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0322701 A1 * | 12/2013 | Szymanski ........ H04N 1/00045 382/112 |
| 2013/0342717 A1 | 12/2013 | Havens et al. |
| 2014/0001267 A1 | 1/2014 | Giordano et al. |
| 2014/0002842 A1 | 1/2014 | Ito |
| 2014/0008439 A1 | 1/2014 | Wang |
| 2014/0009529 A1 | 1/2014 | Teshigawara et al. |
| 2014/0025584 A1 | 1/2014 | Liu et al. |
| 2014/0034734 A1 | 2/2014 | Sauerwein, Jr. |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078345 A1 | 3/2014 | Showering |
| 2014/0079292 A1 | 3/2014 | Kaneko et al. |

(56) References Cited

U.S. PATENT DOCUMENTS

| | | |
|---|---|---|
| 2014/0097249 A1 | 4/2014 | Gomez et al. |
| 2014/0098792 A1 | 4/2014 | Wang et al. |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein, Jr. |
| 2014/0108010 A1 | 4/2014 | Maltseff et al. |
| 2014/0108402 A1 | 4/2014 | Gomez et al. |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166759 A1 | 6/2014 | Liu et al. |
| 2014/0168709 A1 | 6/2014 | Tokumaru |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Liu et al. |
| 2014/0197239 A1 | 7/2014 | Havens et al. |
| 2014/0197304 A1 | 7/2014 | Feng et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0267609 A1 | 9/2014 | Laffargue |
| 2014/0270196 A1 | 9/2014 | Braho et al. |
| 2014/0270229 A1 | 9/2014 | Braho |
| 2014/0278387 A1 | 9/2014 | Digregorio |
| 2014/0278391 A1 | 9/2014 | Braho et al. |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0291401 A1 | 10/2014 | Nakamura |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0039878 A1 | 2/2015 | Barten |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0060544 A1 | 3/2015 | Feng et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0078627 A1 | 3/2015 | Fukase |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chen et al. |
| 2015/0169929 A1 | 6/2015 | Williams et al. |
| 2015/0178523 A1 | 6/2015 | Gelay et al. |
| 2015/0178534 A1 | 6/2015 | Jovanovski et al. |
| 2015/0178535 A1 | 6/2015 | Bremer et al. |
| 2015/0178536 A1 | 6/2015 | Hennick et al. |
| 2015/0178537 A1 | 6/2015 | El et al. |
| 2015/0181093 A1 | 6/2015 | Zhu et al. |
| 2015/0181109 A1 | 6/2015 | Gillet et al. |
| 2015/0193644 A1 | 7/2015 | Kearney et al. |
| 2015/0221077 A1 | 8/2015 | Kawabata et al. |
| 2015/0281019 A1* | 10/2015 | Hashizume ............ H04L 41/147 709/224 |
| 2015/0312780 A1 | 10/2015 | Wang et al. |
| 2015/0324623 A1 | 11/2015 | Powilleit |
| 2015/0327012 A1 | 11/2015 | Bian et al. |
| 2016/0042241 A1 | 2/2016 | Todeschini |
| 2016/0057230 A1 | 2/2016 | Todeschini et al. |
| 2016/0125217 A1 | 5/2016 | Todeschini |
| 2016/0125342 A1 | 5/2016 | Miller et al. |
| 2016/0178479 A1 | 6/2016 | Goldsmith |
| 2016/0189087 A1 | 6/2016 | Morton et al. |
| 2016/0255241 A1 | 9/2016 | Harashima et al. |
| 2016/0282807 A1 | 9/2016 | Kinoshita et al. |
| 2016/0292477 A1 | 10/2016 | Bidwell |
| 2016/0314276 A1 | 10/2016 | Wilz et al. |

(56) References Cited

U.S. PATENT DOCUMENTS

| | | | |
|---|---|---|---|
| 2016/0314294 A1 | 10/2016 | Kubler et al. | |
| 2016/0327614 A1 | 11/2016 | Young et al. | |
| 2016/0343163 A1 | 11/2016 | Venkatesha et al. | |
| 2016/0377414 A1 | 12/2016 | Thuries et al. | |
| 2017/0060494 A1 | 3/2017 | Palmen et al. | |
| 2017/0083734 A1 | 3/2017 | Henning et al. | |
| 2017/0182819 A1 | 6/2017 | Gonzalez et al. | |
| 2017/0206643 A1 | 7/2017 | Weiss et al. | |
| 2017/0309011 A1 | 10/2017 | Hori et al. | |
| 2018/0131815 A1 | 5/2018 | Spivakovsky et al. | |
| 2018/0198937 A1 | 7/2018 | Yoshizawa | |
| 2018/0227463 A1 | 8/2018 | Fukase | |
| 2018/0268534 A1 | 9/2018 | Kaneko | |
| 2019/0116275 A1* | 4/2019 | Edwards | G02B 3/08 |
| 2020/0145546 A1 | 5/2020 | Alaganchetty et al. | |
| 2021/0405938 A1 | 12/2021 | Gutierrez et al. | |

FOREIGN PATENT DOCUMENTS

| | | | |
|---|---|---|---|
| JP | 09-027049 | A | 1/1997 |
| JP | 2002-281287 | A | 9/2002 |
| JP | 4644283 | B2 | 3/2011 |
| JP | 2011-110777 | A | 6/2011 |
| JP | 2013-151126 | A | 8/2013 |
| KR | 10-0767433 | B1 | 10/2007 |
| WO | 2013/163789 | | 11/2013 |
| WO | 2013/173985 | | 11/2013 |
| WO | 2014/019130 | | 2/2014 |
| WO | 2014/110495 | | 7/2014 |

OTHER PUBLICATIONS

US 8,616,454 B2, 12/2013, Havens et al. (withdrawn)
Examiner initiated interview summary (PTOL-413B) dated Apr. 16, 2020 for U.S. Appl. No. 16/240,067.
Notice of Allowance and Fees Due (PTOL-85) dated Apr. 16, 2020 for U.S. Appl. No. 16/240,067.
Notice of Allowance and Fees Due (PTOL-85) dated Jun. 2, 2020 for U.S. Appl. No. 16/240,295.
U.S. Appl. No. 16/240,109, filed Jan. 4, 2019, U.S. Pat. No. 10,546,160, Patented.
Communication pursuant to Rules 70(2) and 70a(2) for European Application No. 19150493.5, dated Jul. 15, 2019, 2 pages.
Communication pursuant to Rules 70(2) and 70a(2) for European Application No. 19150494.3, dated Jul. 15, 2019, 2 pages.
Communication pursuant to Rules 70(2) and 70a(2) for European Application No. 19150495.0, dated Jul. 15, 2019, 2 pages.
"Detecting Barcodes in Images with Python and OpenCV"[online] [retrieved on May 27, 2019] Retrieved from the Internet: <https://www.pyimagesearch.com/2014/11/24/detecting-barcodes-images-python-opencv/> dated Nov. 24, 2014.
Anonymous: "How can I quantify difference between two images?—Stack Overflow", [online] [retrieved on May 27, 2019] Retrieved from the Internet:URL:https://stackoverflow.com/questions/189943/how-can-i-quantify-difference-between-two-images> dated Apr. 21, 2015, pp. 1-5.
Basic Image Enhancement and Analysis Techniques, 4 pages, [online], [retrieved on Oct. 3, 2016]. Retrieved from the Internet <URL:https://in.mathworks.com/help/images/image-enhancement-and-analysis.html>.
Extended European Search Report for European Application No. 19150493.5 dated May 24, 2019.
Extended European Search Report for European Application No. 19150494.3 dated Jun. 6, 2019.
Extended European Search Report for European Application No. 19150495.0 dated Jun. 4, 2019.
Faulty Barcode Detection, 11 pages, [online], [retrieved on Oct. 24, 2016]. Retrieved from the Internet <URL:http://tewson.com/sites/default/files/barcode.pdf>.
Find Image Rotation and Scale Using Automated Feature Matching, 7 pages, [online], [retrieved on Oct. 3, 2016], Retrieved from the Internet <URL:hhttps://www.mathworks.com/examples/matlab-computer-vision/mw/vision_product-visionrecovertform-find-image-rotation-and-scale-using-automated-feature-matching>.
Image Analysis, 1 page, [online], [retrieved on Nov. 7, 2016]. Retrieved from the Internet <URL:http://in.mathworks.com/help/images/image-analysis.html>.
Image Enhancement, 1 page, [online], [retrieved on Oct. 3, 2016]. Retrieved from the Internet <URL:http://in.mathworks.com/help/images/image-enhancement-and-restoration.html>.
Imshowpair—compare differences between images, 6 pages, [online], [retrieved on Nov. 7, 2016]. Retrieved from the Internet <URL:http://in.mathworks.com/help/images/ref/imshowpair.html?requestedDomain=in.mathworks.com#bta3zrg>.
Non-Final Rejection dated Jul. 11, 2019 for U.S. Appl. No. 16/240,067.
Non-Final Rejection dated Jun. 26, 2019 for U.S. Appl. No. 16/240,140.
Non-Final Rejection dated May 2, 2019 for U.S. Appl. No. 16/240,109.
Notice of Allowance and Fees Due (PTOL-85) dated Jun. 12, 2019 for U.S. Appl. No. 16/240,109.
Notice of Allowance for U.S. Appl. No. 16/240,109, dated Aug. 14, 2019, 10 pages.
Notice of Allowance for U.S. Appl. No. 16/240,140, dated Nov. 6, 2019, 9 pages.
Office Action for U.S. Appl. No. 14/824,455 dated Nov. 30, 2018, 17 pages.
Office Action for U.S. Appl. No. 16/240,067, dated Jan. 10, 2020, 28 pages.
U.S. Appl. No. 13/367,978 for a Laser Scanning Module Employing an Elastomeric U-Hinge Based Laser Scanning Assembly, filed Feb. 7, 2012, Feng et al.
U.S. Appl. No. 14/277,337 for Multipurpose Optical Reader, filed May 14, 2014, Jovanovski et al.
U.S. Appl. No. 14/283,282 for Terminal Having Illumination and Focus Control filed May 21, 2014, Liu et al.
U.S. Appl. No. 14/446,391 for Multifunction Point of Sale Apparatus With Optical Signature Capture filed Jul. 30, 2014, Good et al.
Corrected Notice of Allowability dated Aug. 7, 2020 for U.S. Appl. No. 16/240,140.
Non-Final Rejection dated Aug. 25, 2020 for U.S. Appl. No. 16/790,417.
Supplemental Notice of Allowability dated Aug. 21, 2020 for U.S. Appl. No. 16/240,295.
Corrected Notice of Allowability dated Jul. 21, 2020 for U.S. Appl. No. 16/240,295.
Notice of Allowance and Fees Due (PTOL-85) dated Jul. 28, 2020 for U.S. Appl. No. 16/240,140.
Notice of Allowance and Fees Due (PTOL-85) dated Jun. 24, 2020 for U.S. Appl. No. 16/240,067.
Non-Final Rejection dated Mar. 12, 2020 for U.S. Appl. No. 16/240,140.
Notice of allowability dated Jan. 27, 2021 for U.S. Appl. No. 16/790,417.
Notice of allowance dated Dec. 31, 2020 for U.S. Appl. No. 16/790,417.
Corrected Notice of Allowability received for U.S. Appl. No. 16/930,022, dated Sep. 9, 2021, 3 pages.
Notice of Allowance and Fees Due (PTOL-85) dated Aug. 11, 2021 for U.S. Appl. No. 17/010,515.
Notice of Allowance received for U.S. Appl. No. 16/930,022, dated Aug. 23, 2021, 3 pages.
Communication Pursuant to Article 94(3) received for European Application No. 19150494.3, dated Aug. 13, 2021, 6 pages.
Communication Pursuant to Article 94(3) received for European Application No. 19150493.5 dated Jul. 15, 2021, 7 pages.
Communication Pursuant to Article 94(3) issued in European Application No. 19150493.5 dated Jul. 15, 2021, 7 pages.
Communication Pursuant to Article 94(3) issued in European Application No. 19150495.0 dated Jul. 9, 2021, 6 pages.
Corrected Notice of Allowability (PTOL-37) dated Sep. 23, 2020 for U.S. Appl. No. 16/240,140.
Notice of Allowability (PTOL-37) dated Sep. 16, 2020 for U.S. Appl. No. 16/240,140.

(56) References Cited

OTHER PUBLICATIONS

Notice of Allowance received for U.S. Appl. No. 16/930,022, dated Jun. 8, 2021, 12 pages.
Supplemental Notice of Allowability (PTOL-37) dated Sep. 10, 2020 for U.S. Appl. No. 16/240,295.
Corrected Notice of Allowability received for U.S. Appl. No. 17/010,515, dated Nov. 5, 2021, 2 pages.
Notice of Allowance received for U.S. Appl. No. 16/930,022, dated Sep. 22, 2021, 2 pages.
Supplemental Notice of Allowability received for U.S. Appl. No. 17/010,515, dated Oct. 15, 2021, 2 pages.
Non-Final Rejection dated Feb. 8, 2022 for U.S. Appl. No. 17/301,259.
Communication about intention to grant a European patent received for EP Application No. 19150495.0, dated Nov. 15, 2021, 6 pages.

\* cited by examiner

METHODS, APPARATUSES, AND SYSTEMS FOR PROVIDING PRINT QUALITY FEEDBACK AND CONTROLLING PRINT QUALITY OF MACHINE READABLE INDICIA

CROSS-REFERENCE TO RELATED APPLICATIONS

This non-provisional application is a continuation of U.S. application Ser. No. 16/240,109, filed Jan. 4, 2019, which claims the benefit of U.S. Provisional Patent Application No. 62/614,089, filed Jan. 5, 2018, the entire contents of which are incorporated herein by reference.

FIELD OF THE INVENTION

The present invention relates to printers, and more particularly, to methods, apparatuses, and systems for providing print quality feedback in response to verifying the print quality of printers and controlling the print quality of machine-readable indicia, including printed barcodes and printed OCR-B characters.

BACKGROUND

Applicant has identified many deficiencies and problems associated with existing printers. For example, a print error (or a "print quality problem") may be introduced into the machine-readable indicia for many reasons. Print quality problems are particularly acute in the case of barcode printing, as the barcode encodes data in the width of the bar and space elements.

BRIEF SUMMARY

Various embodiments described herein relate to methods, apparatuses, and systems for providing print quality feedback and controlling print quality of machine-readable indicia.

In accordance with various embodiments, a printer-verifier system for providing print quality feedback and controlling print quality is provided. The printer-verifier system comprising: a printing mechanism configured to print a machine-readable indicia on a print media; a verifier device in electronic communication with the printing mechanism, the verifier device being configured to scan the machine-readable indicia on the print media; a print quality monitoring device in electronic communication with the printing mechanism and the verifier device, the print quality monitoring device being configured to: analyze the print quality of the machine-readable indicia on the print media; determine that the print quality of the machine-readable indicia does not meet predetermined quality standards; and in response to determining that the print quality does not meet the predetermined quality standards, instruct the printing mechanism to print diagnostic information on the print media.

In some embodiments, the diagnostic information comprises at least one of gray levels, ANSI grade levels, numeric ANSI grades, and bar width growth amounts.

In some embodiments, the print quality monitoring device is configured to utilize the diagnostic information to detect errors in the print quality.

In some embodiments, the diagnostic information comprises instructions defining an appropriate course of at least one corrective action, and the at least one corrective action comprises at least one of changing pressure that a printhead of the printing mechanism applies to the print media, changing a temperature of the printhead, cleaning the printhead, repairing the printhead, replacing the printhead, realigning the print media within the printing mechanism, and realigning a printer ribbon within the printing mechanism.

In some embodiments, the print media comprises at least one label, and the machine-readable indicia comprises at least one barcode.

In some embodiments, in response to determining that the print quality does not meet the predetermined quality standards, the print quality monitoring device is further configured to instruct the printing mechanism to print the diagnostic information over the machine-readable indicia on the print media.

In some embodiments, when analyzing the print quality of the machine-readable indicia on the print media, the print quality monitoring device is further configured to: identify a print quality problem associated with the machine-readable indicia; retrieve association data that associates each of a plurality of print quality problems with a plurality of prescribed corrective actions; and determine a prescribed corrective action from the plurality of prescribed corrective actions based on the association data.

In some embodiments, in response to determining that the print quality does not meet the predetermined quality standards, the print quality monitoring device is further configured to instruct the printing mechanism to print the prescribed corrective action on the print media.

In some embodiments, the machine-readable indicia comprises a printed barcode, and analyzing the print quality of the machine-readable indicia further comprises comparing one or more barcode quality parameters of the printed barcode and a barcode print quality standard.

In some embodiments, the one or more barcode quality parameters comprise a modulation parameter, and identifying the print quality problem further comprises identifying a modulation problem in the printed barcode in at least one of a picket fence orientation and a ladder orientation. In some embodiments, determining that the print quality of the machine-readable indicia does not meet the predetermined quality standards further comprises determining a modulation grade of the printed barcode fails to meet an acceptable modulation grade according to a printing application requirement.

In accordance with various embodiments, a method for providing print quality feedback and controlling print quality is provided. The method comprises: printing, by a printer-verifier apparatus, a machine-readable indicia on a print media; scanning, by the printer-verifier apparatus, the machine-readable indicia on the print media; analyzing, by the printer-verifier apparatus, the print quality of the machine-readable indicia on the print media; determining, by the printer-verifier apparatus, that the print quality of the machine-readable indicia does not meet predetermined quality standards; and in response to determining that the print quality does not meet the predetermined quality standards, printing, by the printer-verifier apparatus, diagnostic information on the print media.

In accordance with various embodiments, a printer verification device comprises a sensing device configured to optically sense an image printed onto print media within a printer. The printer verification device further comprises a quality analyzing device configured to analyze the print quality of the image printed onto the print media. A printer control device is configured to instruct a printing mechanism to print diagnostic information onto the print media when the quality analyzing device determines that the print quality does not meet predetermined quality standards.

In accordance with various embodiments, a printer is provided. The printer in this embodiment includes a printing mechanism configured to print images onto print media and a print verification device configured to monitor the print quality of the images printed onto the print media. The print verification device is configured to analyze the print quality to determine if the print quality meets predetermined quality standards. When the print verification device determines that the print quality does not meet the predetermined quality standards, the print verification device instructs the printing mechanism to print diagnostic information onto the print media.

In accordance with various embodiments, a method associated with a printer is provided. The method includes a first step of analyzing the print quality of a barcode printed by a printing mechanism onto a label. Another step includes determining if the print quality meets predetermined quality standards. The method also includes instructing the printing mechanism to print diagnostic information onto the label if the print quality does not meet the predetermined quality standards.

In accordance with various embodiments, a method is provided for controlling a print quality of a machine-readable indicium from a printer. An image of the machine-readable indicium is captured. The print quality of the machine-readable indicium from the captured image is evaluated. A print quality problem as a result of the evaluating step is identified. A prescribed corrective action to resolve the print quality problem is determined by retrieving association data that associates different print quality problems with a respective prescribed corrective action. The prescribed corrective action is caused to be implemented such that a next machine-readable indicium does not have the print quality problem. Data is generated from controlling the print quality of the machine-readable indicium. The association data is updated with the data and/or the data is collected and stored for use in printing process control.

In some embodiments, the method further comprises repeating the capturing and evaluating steps for each machine-readable indicium. In some embodiments, the method further comprises generating at least one diagnostics report.

In some embodiments, causing implementation of the prescribed corrective action comprises adjustment of a printhead temperature and a speed of the printer when the modulation problem of the printed barcode is in both the picket fence orientation and the ladder orientation; implementing an adjustment in printhead temperature when the modulation problem of the printed barcode is in the picket fence orientation only; and implementing an adjustment in print speed when the modulation problem is in the ladder orientation only.

In some embodiments, one of the barcode quality parameters comprises a defects parameter. Identifying the print quality problem comprises identifying defects in the printed barcode, and causing implementation of the prescribed corrective action comprises communication to a user of the printer to change print media for a next printed barcode.

In some embodiments, the machine-readable indicium comprises a printed OCR-B character and evaluating the print quality comprises: applying a binarization algorithm to the printed OCR-B character and comparing the printed OCR-B character after application of the binarization algorithm to a print quality standard.

In some embodiments, identifying a print quality problem comprises identifying the print quality problem in the printed OCR-B character by non-conformity of the printed OCR-B character with a Stroke Width Template described in ISO/IEC standard 30116.

In some embodiments, causing implementation of the prescribed corrective action comprises implementing an adjustment in at least one of print speed and printhead temperature if the printed OCR-B character does not conform with the Stroke Width Template by exceeding or being short of an outer character boundary of the Stroke Width Template and by communication to a user of the printer to change print media for next printed OCR-B character if the printed OCR-B character does not conform with the Stroke Width Template by having defects therein.

In some embodiments, the captured machine-readable indicium comprises a first captured image. The method further comprises: capturing the image of the next machine-readable indicium from same printer to obtain a second captured image; evaluating the print quality of the next machine-readable indicium from the second captured image; and verifying, after the prescribed corrective action has been implemented, that the next machine-readable indicium does not have the print quality problem, thereby determining that the prescribed corrective action resolved the print quality problem.

In accordance with various embodiments, a method is provided for controlling print quality of a printed barcode from a printer, according to various embodiments of the present invention. An image of the printed barcode from a printer is captured to obtain a captured image. The printed barcode is formatted in a picket fence orientation and in a ladder orientation. A print quality of the printed barcode is evaluated. A modulation problem in both the picket fence orientation and the ladder orientation of the printed barcode is identified as a result of the evaluating step. A prescribed corrective action is determined for improving a modulation grade of the printed barcode. Adjustment of the printer is caused to implement the prescribed corrective action to improve the modulation grade of a next printed barcode.

In some embodiments, causing adjustment of the printer to implement the prescribed corrective action comprises adjusting a printhead temperature for the next printed barcode in the picket fence orientation and adjusting a print speed of the printer for the next printed barcode in the ladder orientation.

In accordance with various embodiments, a method is provided for controlling print quality of a printed barcode from a printer, according to various embodiments of the present invention. An image of the printed barcode from a printer is captured (a captured image). A print quality of the printed barcode from the captured image is evaluated. A defect in the printed barcode is identified as a result of the evaluating step. A prescribed corrective action for decreasing defects in a next printed barcode is determined. The prescribed corrective action is communicated to a user of the printer.

In some embodiments, the printed barcode comprises one of: on same print media, a first one-dimensional printed barcode in the picket fence orientation and a second one-dimensional printed barcode in the ladder orientation, the modulation problem identified in both the first one-dimensional printed barcode and the second one-dimensional printed barcode; or a two-dimensional barcode.

In accordance with various embodiments, a method is provided for controlling print quality of a printed OCR-B character from a printer, according to various embodiments of the present invention. An image of the printed OCR-B character from a printer is captured to obtain a captured image. A print quality of the printed OCR-B character is evaluated by applying a binarization algorithm to the printed OCR-B character and comparing the printed OCR-B character after the binarization algorithm has been applied to a print quality standard. A print quality problem in the printed OCR-B character is identified as a result of the evaluating step. A prescribed corrective action is determined for improving a grade of the printed OCR-B character. Adjustment of the printer is implemented based on the prescribed corrective action to improve the grade of a next printed OCR-B character.

In some embodiments, evaluating the print quality comprises analyzing one or more barcode quality parameters of the printed barcode from the captured image and comparing the results against a barcode print quality standard, wherein one of the barcode quality parameters comprises a defects parameter; identifying the defect in the printed barcode comprises identifying that defects grade of the printed barcode fails to meet an acceptable defects grade according to a printing application requirement; and determining the prescribed corrective action comprises retrieving association data that specifically associates a failure to meet the acceptable defects grade with the prescribed corrective action.

In some embodiments, communicating the prescribed corrective action to the user of the printer comprises communicating that the prescribed corrective action comprises at least one of changing print media and cleaning a printhead.

The foregoing illustrative summary, as well as other exemplary objectives and/or advantages of the invention, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION OF THE INVENTION

Figure 1:
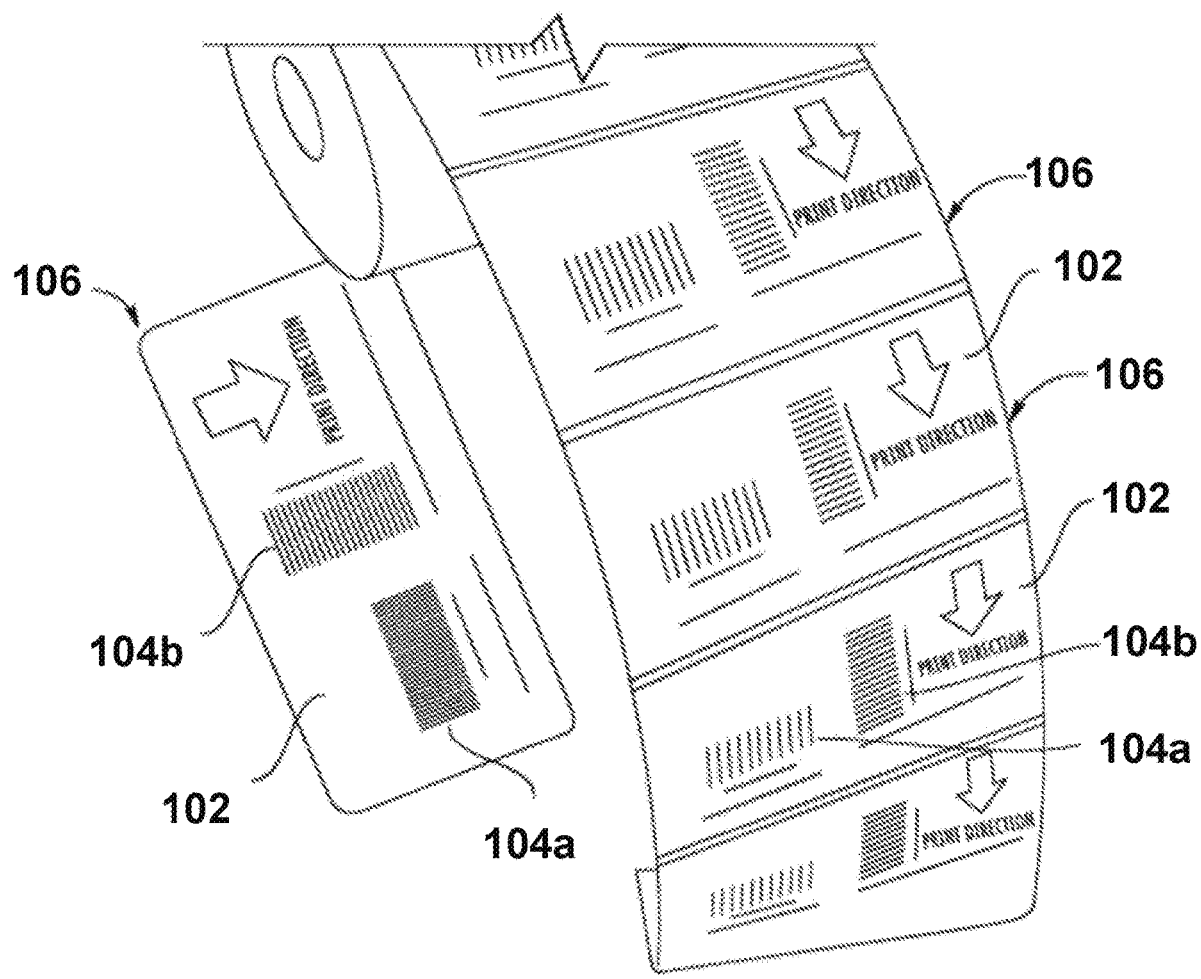
FIG. 1 depicts a plurality of exemplary printed barcodes, where the printed barcode on each individual print media comprising a first one-dimensional barcode in a picket fence orientation and a second one-dimensional barcode in a ladder orientation.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such component or feature may be optionally included in some embodiments, or it may be excluded.

Various embodiments of the present invention will be described in relation to a thermal transfer printer. However, the present invention may be equally applicable to other types and styles of printers (inclusive of printer-verifiers) (e.g., a thermal direct printer, a laser toner printer, an ink drop printer, etc.).

As used herein, the term "printer" refers to a device that prints barcodes, OCR-characters, text, illustrations, etc. onto print media (e.g., labels, tickets, plain paper, synthetic paper, receipt paper, plastic transparencies, and the like). Unless otherwise indicated, the term "printer" encompasses printers with or without an integrated verifier. The print media may be continuous or non-continuous.

As used herein, the terms "machine-readable indicia," "machine-readable indicium," "barcode" and "OCR-B character" refer to an optical representation of data (e.g., data is encoded into the barcode and OCR-B character) that may be scanned (i.e., machine read) by a machine-reader. There are many types of barcodes and OCR-B characters for many applications. Barcodes may be one-dimensional barcodes (e.g., Universal Product Code, U.P.C.) having dark lines (i.e., bars) and light lines (i.e., spaces) of various widths arranged along a scan axis. Barcodes may be two-dimensional matrix symbols (e.g., Aztec Code, Data Matrix, QR Code), PDF417, etc.) (herein a "two-dimensional barcode") having a two-dimensional array of light features, dark features, and (in some cases) alignment features. The light and dark features may include "modules", i.e., the printed (or unprinted) squares in a two-dimensional matrix symbol. An exemplary two-dimensional barcode (e.g., QR Code) is partially depicted in FIG. 2. The graphical look of a two-dimensional barcode is created by different patterns of geometric shapes. Some barcodes may use color (e.g., Ultracode) to encode data. OCR-B characters also encode data and include "modules" (i.e., printed or unprinted squares).

Barcodes and OCR-B characters are printed on the print media. Once printed on a print media, the barcode is referred to herein as a "printed barcode." Similarly, the OCR-B character is referred to herein as a "printed OCR-B character" once printed on a print media. The print media on which the machine-readable indicium is printed may also be referred to herein as a "printed medium." The printed medium may be affixed to an item. For example, the encoded data of the printed barcode may relate to the item(s) on which the printed medium is affixed. The terms "barcode" and "symbol" may be used interchangeably herein.

The tolerance of the machine-readable indicia is closely related to the machine reader's ability to read the printed indicium (e.g., a printed barcode) in a single scan, and to correctly interpret the encoded data. Additionally, a "machine-readable indicium" or "machine-readable indicia" (such as a OCR-B character) may suffer from a print quality problem such that it is not actually machine readable.

I. Example Apparatus for Implementing Embodiments of the Present Invention

Embodiments of the present invention may be implemented as apparatus and systems for providing print quality feedback and controlling print quality of machine-readable indicia.

A. Print Media and Machine Readable Indicia

Referring to FIG. 1, an exemplary print media 102 is shown according to various embodiments of the present invention. On the exemplary print media 102, machine-readable indicia (e.g. barcodes 104a and 104b) may be printed to create a printed medium 106.

The quality of the printed barcodes 104a and 104b depends in part on the orientation of the printed barcodes 104a and 104b on the print media 102 (e.g., the label orientation) and the printing direction of the printed barcodes 104a and 104b.

When the bars of a one-dimensional linear barcode (e.g. the barcode 104a) are parallel to the movement of the print media stock through the printer, this is referred to as printing the barcode 104a as a "picket fence." As illustrated in FIG. 1, the printed barcode 104a comprises a first one-dimensional barcode. When the bars of the one-dimensional (linear) barcode (e.g. the barcode 104b) are perpendicular to the direction of the print media stock through the printer, this is referred to as printing the barcode 104b as a "ladder" because, if positioned vertically, the printed barcode 104b resembles a ladder. As illustrated in FIG. 1, the printed barcode 104b comprises a second one-dimensional barcode.

Further, as shown in FIG. 1, the first one-dimensional barcode 104a and the second one-dimensional barcode 104b are printed on the same print media 102. For purposes of discussing modulation problems in both directions or orientations hereinafter, "a printed barcode" may comprise the first one-dimensional barcode 104a and the second one-dimensional barcode 104b printed on the same print media 102.

Figure 2:
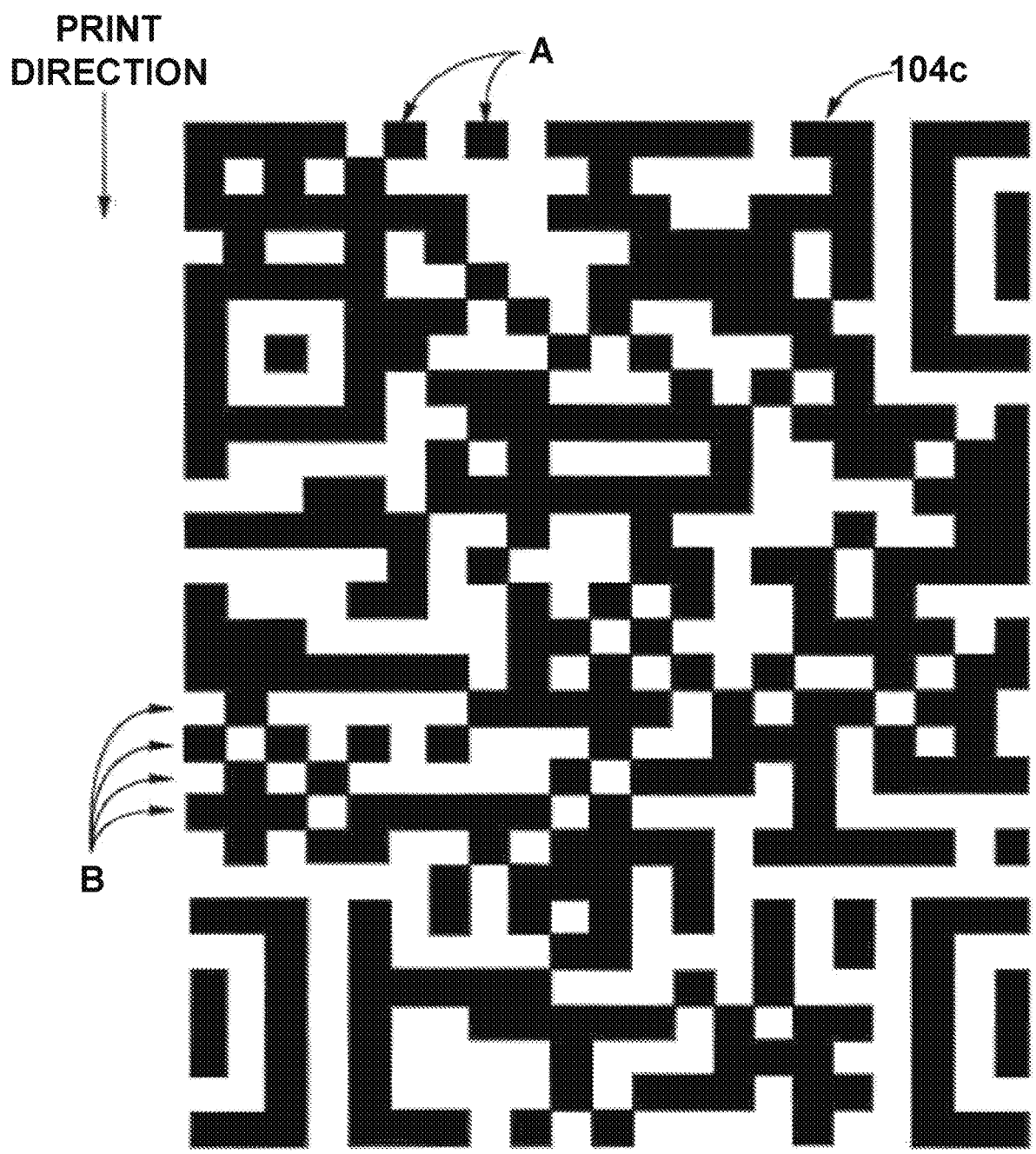
FIG. 2 depicts an exemplary printed barcode (a portion of a QR Code) comprising a two-dimensional barcode formatted in both the picket fence orientation and the ladder orientation.

Referring to FIG. 2, a two-dimensional printed barcode 104c (a QR Code) is shown. The two-dimensional printed barcode 104c incorporates both vertical and horizontal dimensions, where the picket fence orientation refers to the print direction in which the modules are arranged perpendicular to the movement of the print media, and the ladder orientation refers to the print direction in which the modules are arranged parallel to the movement of the print media. In FIG. 2, features of the two-dimensional printed barcode 104c in the picket face orientation are identified with the letter "A," and the features in the ladder orientation are identified with the letter "B."

B. Printer and Printer-Verifier

Referring now to FIGS. 3 to 6, exemplary apparatuses and systems for controlling the print quality of machine-readable indicia (such as printed barcodes 104a and 104b) and printed OCR-B characters are depicted in accordance with various embodiments of the present invention.

Figure 3:
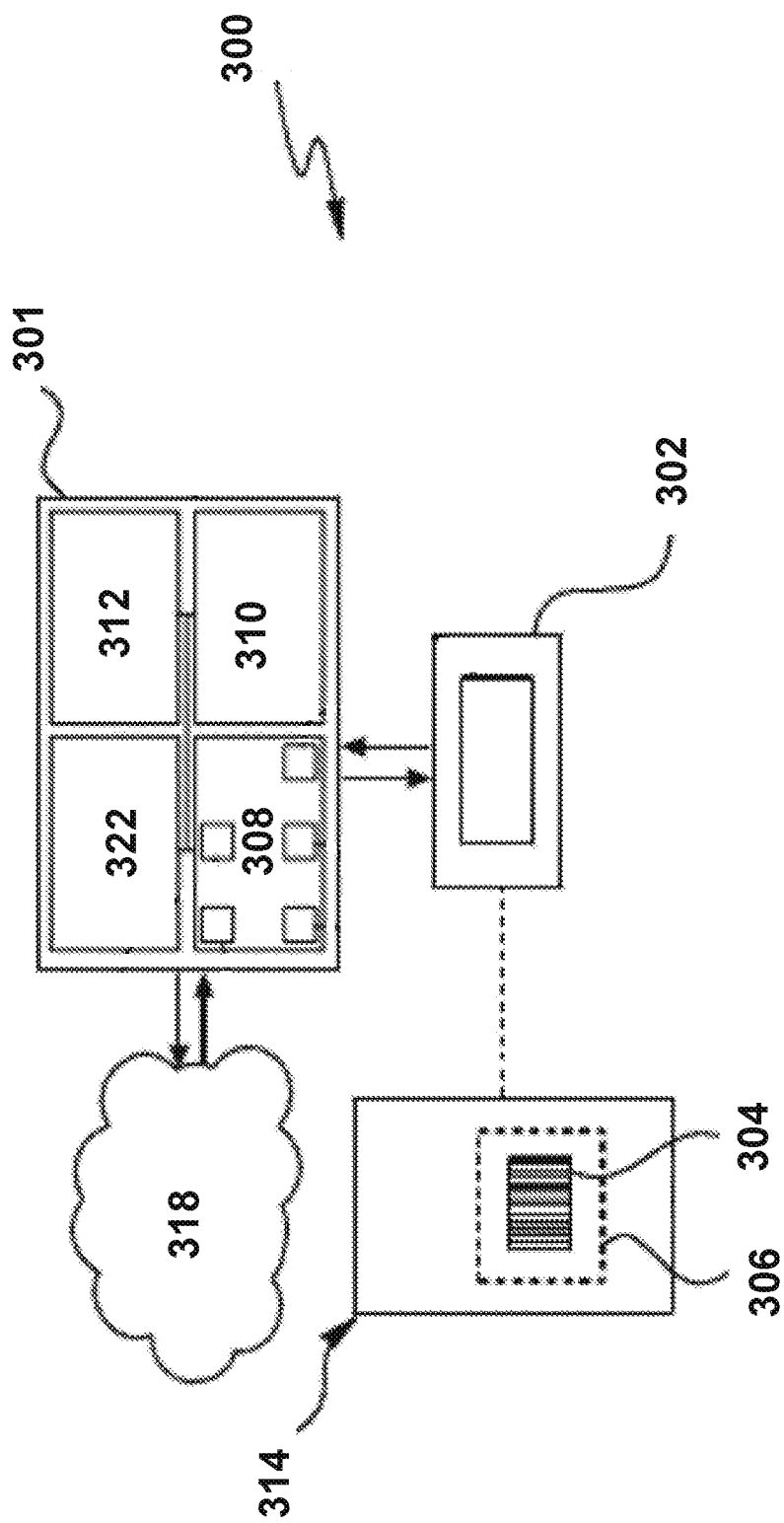
FIG. 3 schematically depicts a block diagram of a system for controlling the print quality of machine-readable indicia, including an imaging module communicatively coupled to a printer, according to various embodiments of the present invention.
Figure 4:
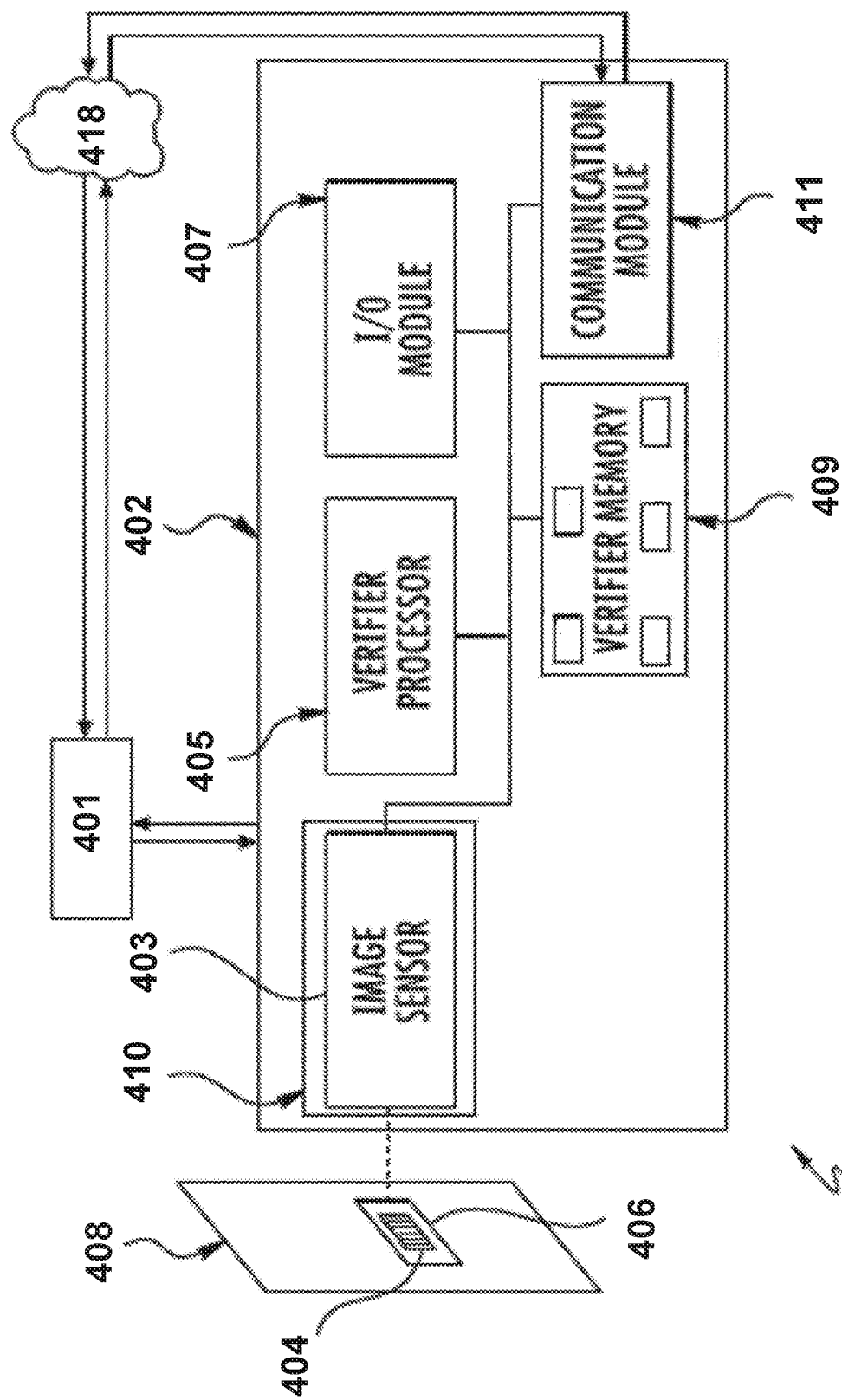
FIG. 4 schematically depicts a block diagram of the printer communicatively coupled to an exemplary verifier that is depicted as capturing an image of an exemplary machine-readable indicium (an exemplary printed one-dimensional barcode), according to various embodiments of the present invention.
Figure 5:
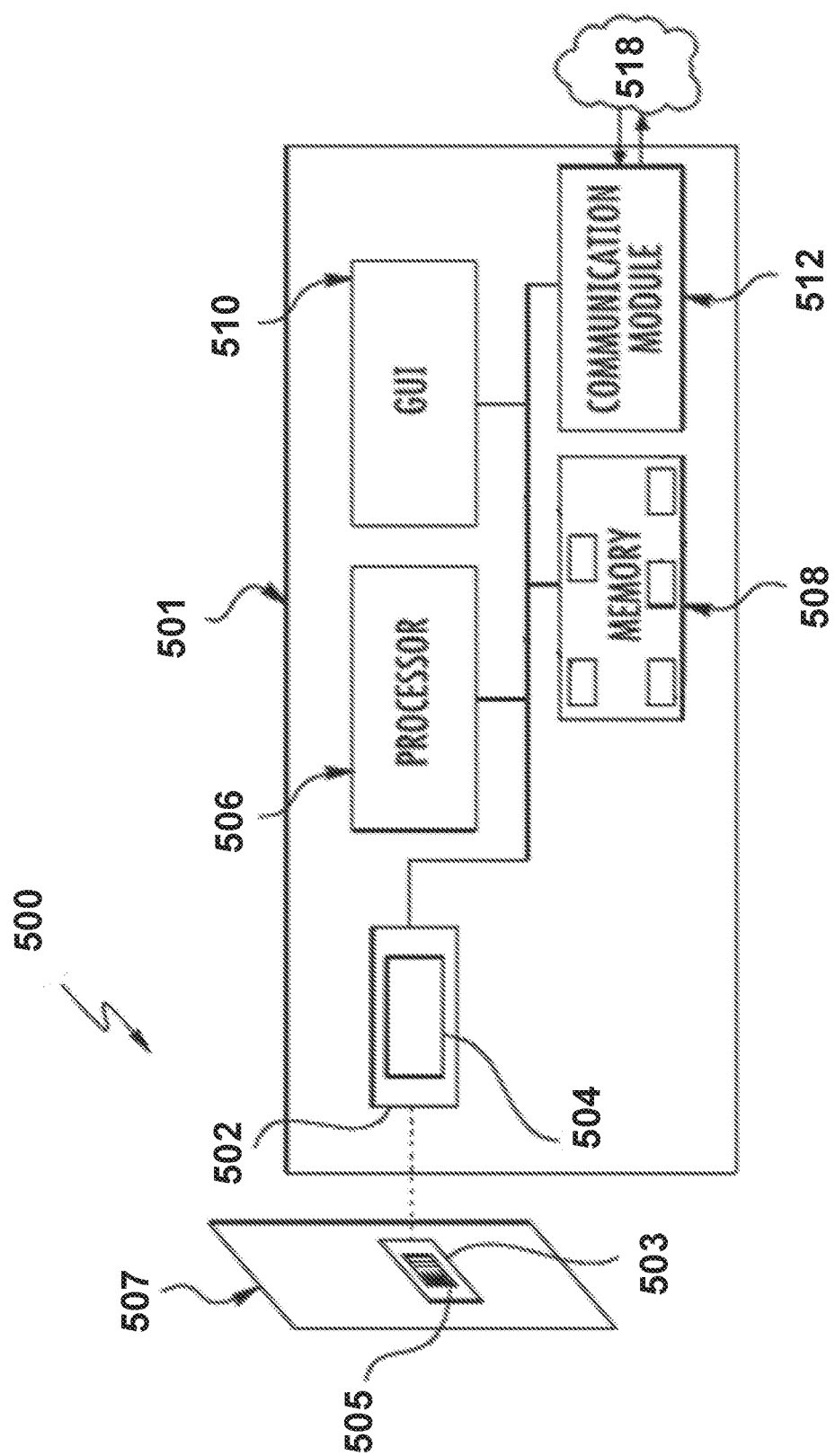
FIG. 5 schematically depicts a block diagram of a printer-verifier, including the imaging module, for controlling the print quality of an exemplary machine-readable indicium (an exemplary printed barcode) in accordance with various embodiments of the present invention.

FIGS. 3-5 are block diagrams illustrating different embodiments of the printer and printer-verifier in accordance with the present invention.

Referring now to FIG. 3, the system 300 comprises a printer 301 communicatively coupled to an imaging module 302. While the imaging module 302 is depicted in FIG. 3 as a separate device, it is to be understood that the imaging module 302 may be disposed in a separate verifier that is attached to the printer 301, or is a standalone device to where the user brings the printed indicia for verification. In either case, the verifier is communicatively coupled to the printer 301.

As shown in FIG. 3, the imaging module 302 is configured to capture an optical image of the machine-readable indicium (such as the printed barcode 304) within a field of view 306. The printed barcode 304 is printed on the print media 314.

Referring back to FIG. 3, the processor 322 is communicatively coupled to the memory 308, and may be configured by a print quality verification program to execute the steps of example methods of the present invention (such as methods 700 and 1500 as hereinafter described). The graphical user interface (GUI) 312 may display visual and/or auditory information and receiving information from the user. The printer 301 may be communicatively connected to a computer or a network 318 via a wired or wireless data link using the communications module 310.

Referring now to FIG. 4, the system 400 comprises a printer 401 communicatively coupled to a verifier 402. The verifier 402 comprises an imaging module 410, a verifier processor 405, an I/O module 407, a verifier memory 409, and a communication module 411.

The imaging module 410 may further comprise an image sensor 403. The image sensor 403 uses an imaging lens (or lenses) to form a real image of the field of view 406 on an array of photo sensors (e.g., a linear or 2D array CCD, CMOS sensor, CIS, etc.). Electronic signals from the photo sensors are used to create gray level or color images, e.g., which would result in a digital image that may be obtained by a digital camera. The image sensor 403 is configured to capture an optical image of the machine-readable indicium (such as the printed barcode 404) within the field of view 406. The printed barcode 404 is printed on a print media 408.

As shown in FIG. 4, the verifier 402 may also comprise a memory (verifier memory 409) electrically connected to the imaging module 410 and a central processing unit (CPU) (herein a "verifier processor" 405). The verifier 402 may further comprise an I/O module 407 and a verifier communications module 411. The subsystems in the verifier 402 of FIG. 4 are electrically connected via a coupler (e.g., wires, traces, etc.) to form an interconnection subsystem. The interconnection system may include power buses or lines, data buses, instruction buses, address buses, etc., which allow operation of the modules/subsystems and the interaction there between. The I/O module 407 may include a verifier graphical user interface. In various embodiments, the verifier 402 may be communicatively connected using the verifier communications module 411 to the computer or the network 418 via a wired or wireless data link. In a wireless configuration, the communication module may communicate with a host device over the network via a variety of communication protocols (e.g., WI-FI®, BLUETOOTH®, CDMA, TDMA, or GSM).

While FIG. 4 depicts a verifier memory 409 and a processor 405 in the verifier 402, it is to be understood that only the printer 401 or only the verifier 402, or both the printer 401 and verifier 402 communicatively coupled thereto may comprise the memory and the processor for executing the steps as hereinafter described, i.e., at least one of the verifier and the printer comprises a memory communicatively coupled to the imaging module and a processor communicatively coupled to the memory.

Referring now to FIG. 5, the system 500 comprises a printer-verifier 501 with an imaging module 502 disposed in the printer-verifier 501 itself. When an imaging module is disposed in a printer, the printer is also referred to as a "printer-verifier" hereinafter. The imaging module 502 may comprise an image sensor 504 configured to capture an optical image of the machine-readable indicium (such as the printed barcode 503) on a print media 507 within a field of view 505, similar to the image sensor 403 described above in connection with FIG. 4.

The imaging module 502 is further in electronic communication with the processor 506, the graphical user interface (GUI) 510, the memory 508, and the communication module 512. The GUI 510 may display visual and/or auditory information and receiving information from the user. The printer-verifier 501 may be communicatively connected to a computer or a network 518 via a wired or wireless data link using the communication module 512.

As shown by comparing FIG. 5 (printer-verifier 501) with FIG. 3 (printer 301), the printer 301 and printer-verifier 501 may include the same components other than inclusion of the imaging module 502 in the printer-verifier 501. The printer 301 and the printer-verifier 501 are capable of printing machine-readable indicium on the print media.

In accordance with various embodiments of the present invention, the printer-verifier 501 depicted in FIG. 5 is configured to both print the machine-readable indicium and control (via the processor 506 of printer-verifier) the print quality of the machine-readable indicium by executing the method steps according to various embodiments as hereinafter described. More specifically, the printer-verifier 501 utilizes the imaging module 502 for capturing an image of the machine-readable indicium on print media. The memory 508 is communicatively coupled to the imaging module 502 and configured to store a print quality verification program. The processor 506 is communicatively coupled to the memory 508 and configured by the print quality verification program to execute the method steps according to various embodiments of the present invention in order to control the print quality of the machine-readable indicium In accordance with various embodiments of the present invention, when the verifier is attached to the printer, the verifier may rely on the memory and the processor of printer for executing the steps as hereinafter described. In embodiments where the verifier is a standalone device, the verifier has its own verifier memory and processor for executing the steps as hereinafter described.

Additionally, or alternatively, the printer may rely on the memory and processor of verifier attached to the printer for executing the steps as hereinafter described. Therefore, the processor in at least one of the printer and the verifier (or in the printer-verifier) is configured by the computer program to execute the steps as hereinafter described.

Figure 6:
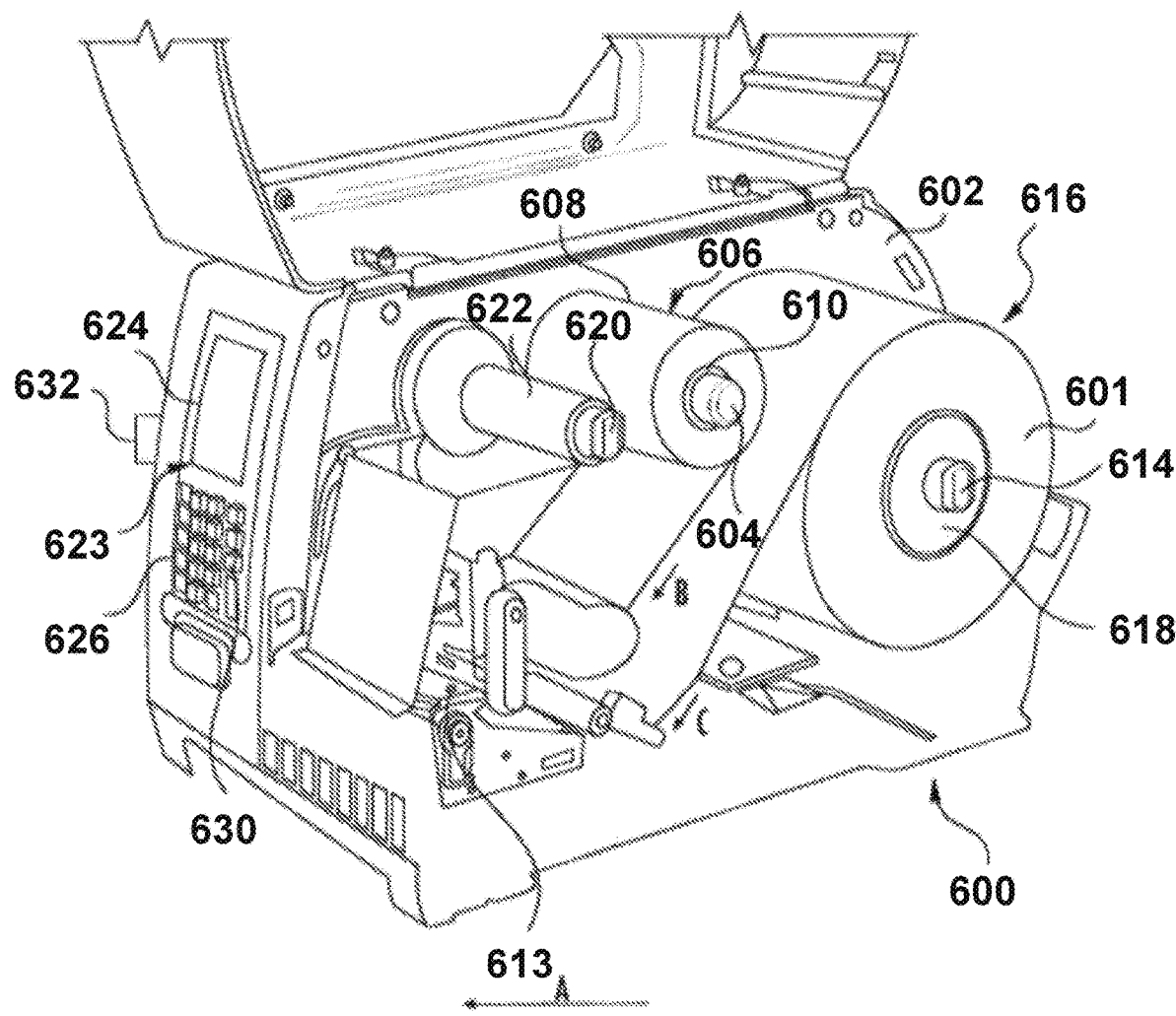
FIG. 6 graphically illustrates a portion of an exemplary printer/printer-verifier in accordance with various embodiments of the present invention, where a cover of the printer/printer-verifier is removed to illustrate an interior of the printer/printer-verifier.

Referring now to FIG. 6, the printer/printer-verifier 600 has a body 602 for enclosing the interior thereof. The printer/printer-verifier 600 further comprises a power source and a moveable cover (removed in FIG. 6 for the purpose of illustration) for accessing the interior thereof. In some embodiments, the printer/printer-verifier 600 may include an integrated verifier as described above. In some embodiments, the printer/printer-verifier 600 may be in electronic communication with a separated verifier.

The printer/printer-verifier 600 (for example, a thermal transfer printer/thermal transfer printer-verifier) may comprise a ribbon supply spindle 604 contained within the body 602. A ribbon supply roll 606 is configured to be disposed on the ribbon supply spindle 604. The ribbon supply roll 606 comprises ink ribbon 608 on a ribbon supply spool 610. The ink ribbon supplies the media (e.g., ink) that transfers onto the print media.

The printer/printer-verifier 600 may further comprise a thermal printhead 613 utilized to thermally transfer a portion of ink from the ink ribbon 608 to the print media 601 as the ink ribbon is unwound from the ribbon supply spool 610 along a ribbon path (arrow B in FIG. 6) and the print media 601 is unwound from a media supply spool 618 along a media path (arrow C in FIG. 6).

The media supply roll 616 comprises the print media 601 on the media supply spool 618. A media supply spindle 614 on which the media supply roll 616 is configured to be disposed is contained within the body 602. A ribbon rewind spindle 620 on which unwound ribbon is wound up may also be contained within the body 602. A ribbon take-up 622 may be disposed on the ribbon rewind spindle 620, although the ribbon take-up 622 on the ribbon rewind spindle 620 may not be necessary.

The printer/printer-verifier 600 may further comprise one or more motors for rotating the ribbon supply spindle 604 and the ribbon roll disposed thereon (if present) in a forward (arrow A in FIG. 6) or a backward rotational direction (dependent on the ink surface) for rotating the media supply roll 616 disposed on the media supply spindle 614 in a forward rotational direction, and for rotating the ribbon rewind spindle 620. In the direct transfer printer/direct transfer printer-verifier, the ribbon supply spool, the ribbon rewind spool, and the ribbon may be eliminated, and a thermally sensitive paper may replace the print media.

The printer/printer-verifier 600 may further comprise a graphical user interface (GUI) 623 for displaying visual and/or auditory information and receiving information from the user (e.g., typed, touched, spoken, etc.). The body 602 of the printer/printer-verifier 600 may include the graphical user interface 623 with, for example, a display 624 and a keypad 626 with function buttons 630.

Further, similar to those embodiments described above in connection with FIGS. 3-5, the printer/printer-verifier 600 further comprises a central processing unit (CPU) 632 (herein a "processor") communicatively coupled to a memory, and a communications module. The central processing unit (CPU) 632 is the electronic circuitry within a computer that carries out the instructions of a program by performing the basic arithmetic, logical, control and input/output (I/O) operations specified by the instructions as hereinafter described. The printer/printer-verifier 600 may be communicatively connected using the communications module to a computer or a network via a wired or wireless data link. In a wireless configuration, the communications module may communicate with a host device over a network via a variety of communication protocols (e.g., WI-FI®, BLUETOOTH®, CDMA, TDMA, or GSM). In accordance with various embodiments of the present invention, the processor 632 is communicatively coupled to the memory and may be configured by a print quality verification program to execute the steps of methods 700 and 1500, as hereinafter described.

II. Example Method for Implementing Embodiments of the Present Invention

Embodiments of the present invention may be implemented as methods for providing print quality feedback and controlling print quality of machine-readable indicia.

It will be understood that each block of the flowchart, and combinations of blocks in the flowchart, may be implemented by various means, such as hardware, firmware, one or more processors, circuitry and/or other devices associated with execution of software including one or more computer program instructions. For example, one or more of the procedures described herein may be embodied by computer program instructions. In this regard, the computer program instructions which embody the described procedures may be stored by the verifier memory of a printing and verifying system employing an embodiment of the present disclosure and executed by a processor in the printing and verifying system.

As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a specific manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 7 and 15, when executed, convert a computer or processing circuitry into a specific machine configured to perform an example embodiment of the present invention. Accordingly, the operations of FIGS. 7 and 15 define algorithms for configuring a computer or processor, to perform an example embodiment. In some cases, a general-purpose computer may be provided with an instance of the processor which performs the algorithms of FIGS. 7 and 15 to transform the general-purpose computer into a specific machine configured to perform an example embodiment.

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

A. Controlling Print Quality

A verifier may determine, in a verification process, whether the machine-readable indicia meets print quality standards. The verifier automates the verification process by capturing an image of the machine-readable indicia (or indicium), and evaluating the machine-readable indicium in the captured image according to a print quality standard. If the machine-readable indicium fails to meet the print quality standard, the rejected printed medium may be retracted back into the printer and branded with the word "void", after which a next machine-readable indicium is printed by the printer.

The user may adjust the printer in an effort to correct the print quality problem for the next machine-readable indicium, but the correction may or may not be successful, in addition to taking time. The end result is that more than one unusable printed medium may be printed. In addition, the verifier may be attached to the printer or used as a standalone device to where the user brings the machine-readable indicium and indicia for verification. In the case of a standalone device, branding the word "void" may not occur.

Therefore, a need exists for methods for controlling print quality of machine-readable indicia including printed barcodes and OCR-B characters. A further need exists for increasing a modulation grade and/or a defects grade of succeeding printed barcodes, including a next printed barcode. An additional need exists for increasing a grade of succeeding printed OCR-B characters, including a next printed OCR-B character. A still further need exists for methods for controlling print quality of machine-readable indicia to automatically adjust the quality of succeeding machine-readable indicia and generate data for long-term printing process control.

Various embodiments of the present invention embrace methods for controlling print quality of machine-readable indicia such as printed barcodes and printed OCR-B characters. Various embodiments may be particularly useful for substantially correcting poor modulation (i.e., improving a modulation grade) in a next printed barcode in at least one of a picket fence orientation and a ladder orientation, and substantially correcting printing defects (i.e., improving a defects grade) in the next printed barcode, and plotting/analyzing the captured data for long-term printing process control. Improving a modulation grade and/or a defects grade respectively comprises "substantially correcting" the modulation problem and defects problem. Various embodiments are useful for improving a grade of a next printed OCR-B character, and enable automatic diagnosis of the print quality problem and automatic adjustments as a corrective action in response to identification of the print quality problem.

Figure 7:
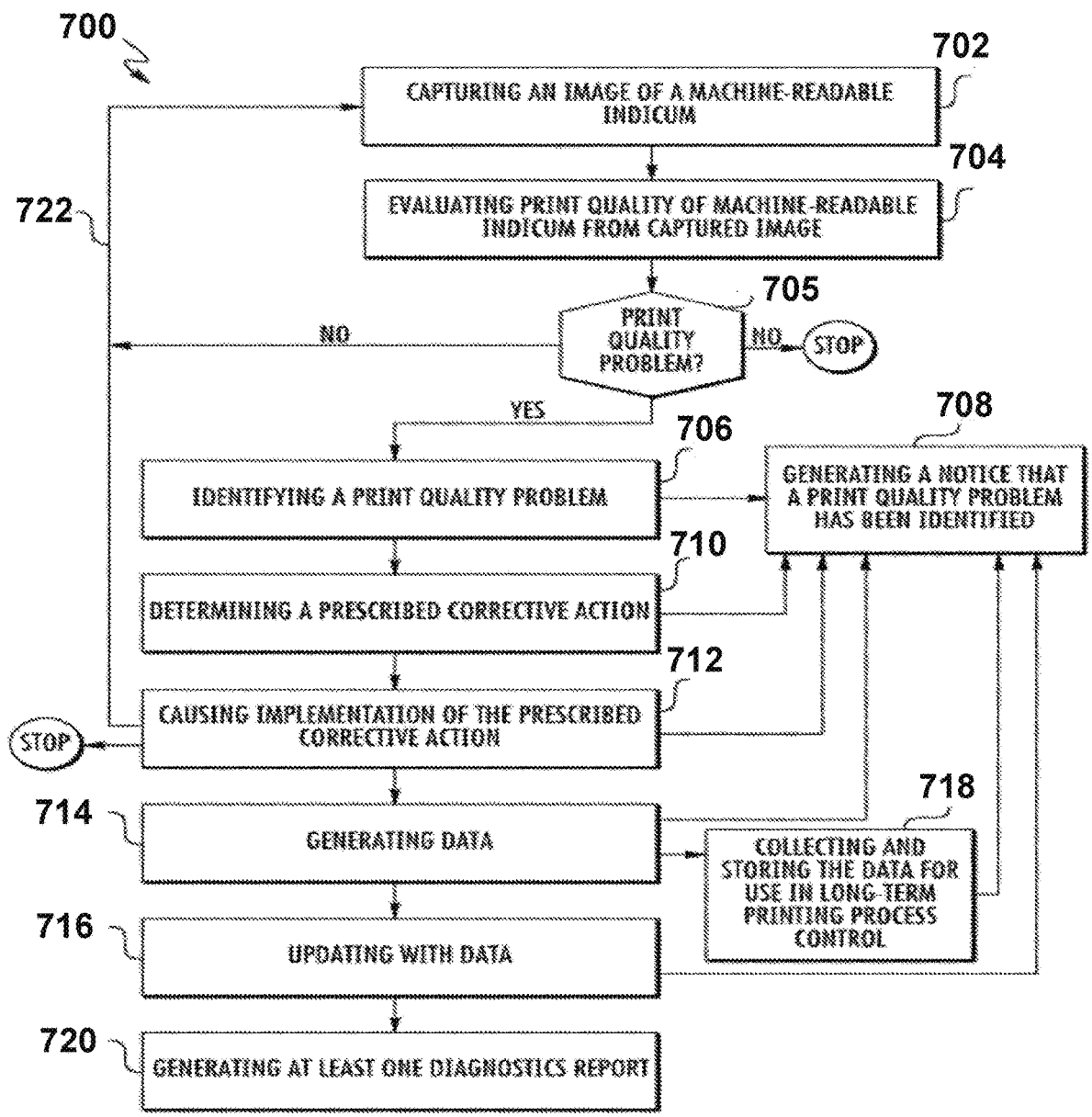
FIG. 7 is a flow diagram depicting a method for controlling the print quality of a machine-readable indicium in accordance with various embodiments of the present invention.

Referring now to FIG. 7, according to various embodiments of the present invention, a method 700 for controlling a print quality of a machine-readable indicium from the printer is disclosed.

The method 700 begins by capturing an image of the machine-readable indicium (at step 702). As noted above, the image is captured by an imaging module (for example, imaging module 302) of a verifier (either a separate verifier or a printer-verifier). The machine-readable indicium may be a printed barcode or a printed OCR-B character.

For example, the printed barcode may be a one-dimensional barcode (e.g., FIG. 1). In this case, the printed barcode may comprise, for example, a first one-dimensional printed barcode 104a in the picket fence orientation and a second one-dimensional printed barcode 104b in the ladder orientation on the same print media as shown in FIG. 1. As another example, the printed barcode may be a two-dimensional barcode such as depicted in FIG. 2.

Figure 8A:
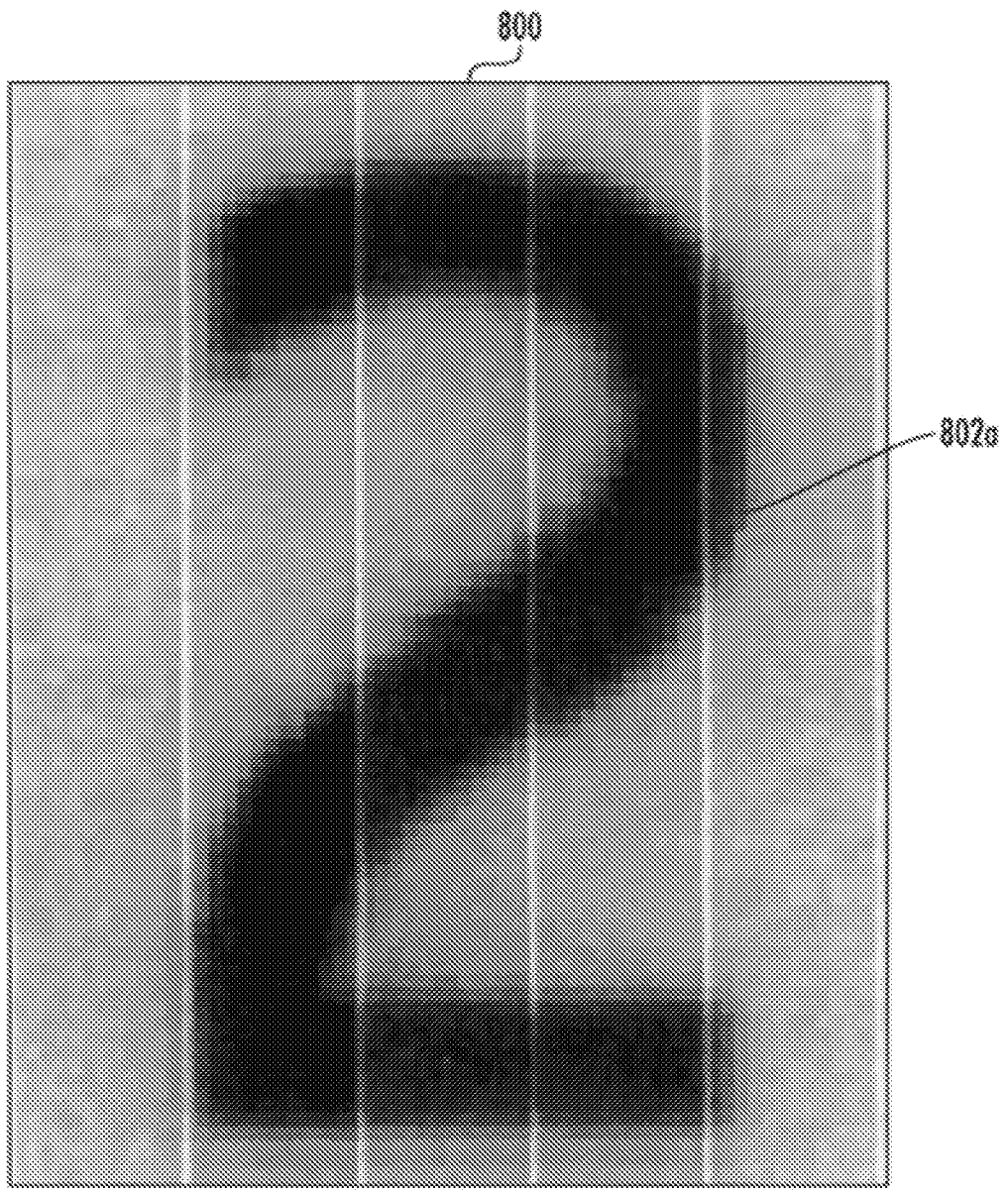
FIGS. 8A, 8B, and 8C graphically depict the steps in a method for controlling the print quality of a printed OCR-B character in accordance with various embodiments of the present invention.

Referring now to FIG. 8A, a captured image 800 of an exemplary printed OCR-B character 802a is depicted. The captured image 800 of the exemplary printed OCR-B character 802a may be, for example, a high-resolution gray level image.

Referring back to FIG. 7, according to various embodiments of the present invention, the method 700 for controlling the print quality of the machine-readable indicium from the printer continues by evaluating the print quality of the machine-readable indicium from the captured image (step 704).

The step of evaluating the print quality of the machine readable indicium from the captured image, in the case of a printed barcode, comprises analyzing one or more barcode quality parameters of the printed barcode from the captured image (more particularly, a quality level achieved for each assessed parameter), and comparing the results against a barcode print quality standard such as a barcode print quality standard set forth in the ISO/IEC 15415, 29158, or 15416 barcode print quality test specifications.

The parameters of barcode quality affect the quality of the printed barcode and are based on the optics of bar code scanning systems. Barcode print quality parameters may include, among other parameters, a modulation parameter and a defects parameter. Each quality parameter will indicate Pass, Fail, or a grade. Both the modulation parameter and the defects parameter may be graded. In this regard, various embodiments of the present invention improve a modulation/defects grade of a printed barcode to "substantially correct" an identified modulation problem.

In addition to evaluating barcode print quality for meeting a print quality standard based on, for example, ANSI/CEN/ISO guidelines, the evaluation of barcode quality includes matching a printing application requirement such as a customer specification. Depend on the printing application requirement, higher or lower modulation grades and/or defects grades may be required.

The step of evaluating the print quality of the machine-readable indicium from the captured image, in the case of a printed OCR-B character (such as the exemplary printed OCR-B character 802a of FIG. 8A), may further comprise applying a binarization algorithm to the printed OCR-B character in the captured image and comparing the printed OCR-B character after the binarization algorithm has been applied to a print quality standard, such as ISO/IEC 30116 (more particularly, overlaying a Stroke Width Template (such as exemplary Stroke Width Template 804 as described in print quality standard ISO/IEC 30116) on the printed OCR-B character).

Figure 8B:
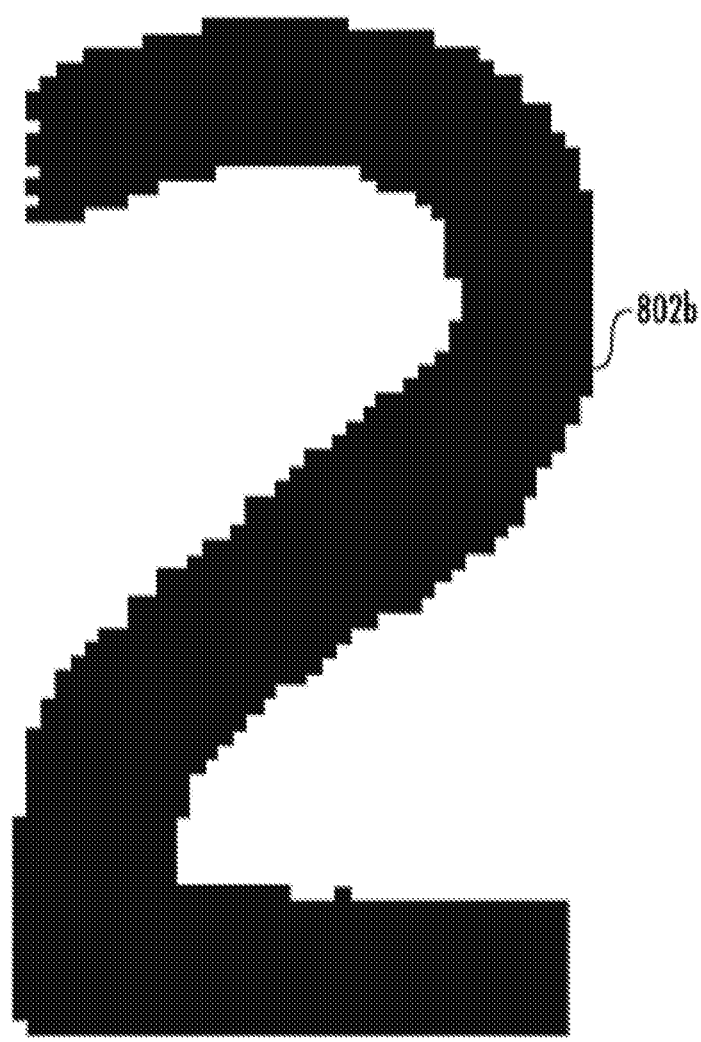

FIG. 8B depicts the exemplary printed OCR-B character 802a of FIG. 8A after the binarization algorithm has been applied and is now referred to with the reference numeral 802b. The binarization algorithm described in ISO/IEC 30116 is incorporated herein by reference in its entirety. In general, the binarization algorithm is described as follows:

Start by creating a histogram of the defined grey-scale values in the defined region and proceeds as follows:
1. Initialize the variable $min_{Variance}$ to a very large number and initialize $T_{min}$ and $T_{max}$ to zero.
2. For every grey-scale value, "t," starting from the lowest grey-scale value to the highest grey-scale value (0 to 255 for an 8-bit image sensor),
  a. Compute the mean and variance of pixels below t and call it $Mean_{Dark}$ and $Variance_{Dark}$
  b. Compute the mean and variance of pixels above or equal to t and call it $Mean_{Light}$ and $Variance_{Light}$
  c. Compute Variance=$Variance_{Light}$+$Variance_{Dark}$.
  d. If Variance<$min_{Variance}$, save Variance in $min_{Variance}$ and save t in $T_{min}$
  e. If Variance=$min_{Variance}$ save t in $T_{max}$.
    Note: The step e is used to break ties. $T_{min}$ is the smallest grey-level where the variance is the minimum and $T_{max}$ is the largest grey-level where the variance is the same minimum.
3. Optimal threshold T=$(T_{min}+T_{max})/2$.

Figure 8C:
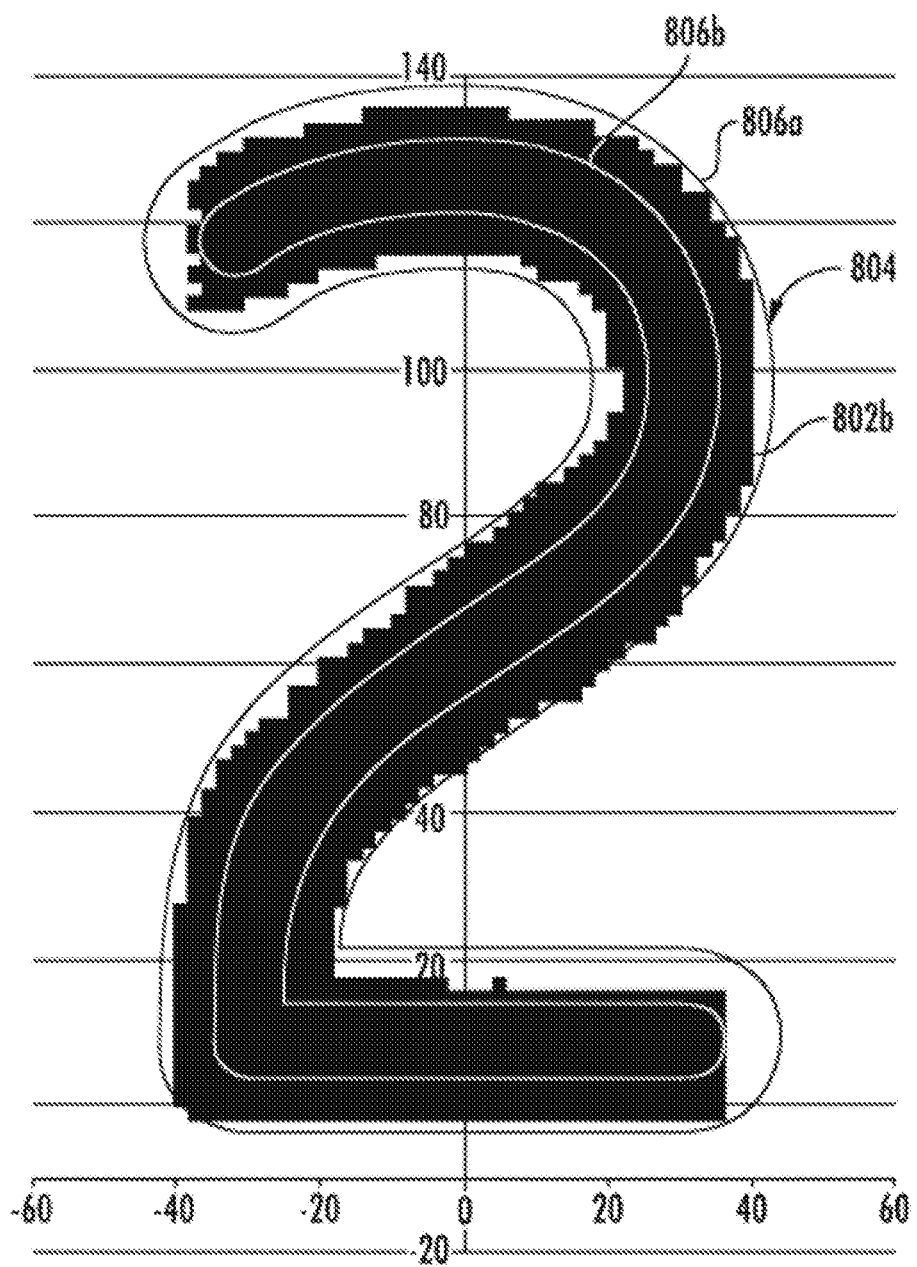

FIG. 8C depicts the exemplary printed OCR-B character after the binarization algorithm has been applied (printed OCR-B character 802b) and overlaid with the exemplary Stroke Width Template 804. A grade of the printed OCR-B character 802a is determined by penalizing the character for every black module outside an outer character boundary 806a of the Stroke Width Template and every white module inside an inner character boundary 806b of the Stroke Width Template.

Various embodiments of the present invention are directed to improving the grade of the printed OCR-B character to "substantially correct" an identified print quality problem as hereinafter described. The exemplary printed OCR-B character 802a of FIG. 8A would receive a good grade. If the printed OCR-B character receives a good grade (or at least an acceptable grade), no corrective action is taken. However, print quality data may be retained for subsequent analysis. If the grade is trending toward a poor grade, corrective action may be initiated prior to printing a next printed medium with the poor grade.

Referring back to FIG. 7, according to various embodiments of the present invention, the method 700 for controlling the print quality of the printed barcode from the printer continues by determining whether there is a print quality problem at step 705. If no, then the method 700 may repeat the capturing and evaluating steps for each machine-readable indicium (step 722). If there is no more machine-readable indicium to capture, the method 700 may stop.

If there is print quality problem identified at step 705, the method 700 may identify the particular print quality problem in step 706. In accordance with some embodiments of the present invention, as used herein, "identifying a print quality problem" in step 706 may incorporate the step of detecting a print quality problem in step 705.

In various embodiments, identifying a print quality problem may comprise identifying a modulation problem in the printed barcode having at least one of a picket fence orientation and a ladder orientation. The modulation problem is identified when a modulation grade of the printed barcode fails to meet an acceptable modulation grade according to the printing application requirement. In various embodiments, a printed barcode in the picket fence orientation, the ladder orientation, or in both the picket fence orientation and the ladder orientation may have a modulation problem. As noted above, the printed barcode in both the picket fence orientation and the ladder orientation may comprise, on the same print media, a first one-dimensional printed barcode in the picket fence orientation (printed barcode 104a in FIG. 1) and a second one-dimensional printed barcode in the ladder orientation (printed barcode 104b in FIG. 1) or a single two-dimensional printed barcode (FIG. 2). When a modulation problem is identified in a one-dimensional printed barcode in both the picket fence orientation and the ladder orientation, the modulation problem is identified in both the first one-dimensional printed barcode 104a and in the second one-dimensional printed barcode 104b on the same print media (e.g. FIG. 1).

Modulation is based on the relationship between the minimum edge contrast and the symbol (barcode) contrast ($EC_{min}$/SC, wherein $EC_{min}$=Edge Contrast Minimum and SC=Symbol Contrast). The greater the difference between minimum edge contrast and symbol contrast, the lower the modulation grade. Stated another way, modulation is related to how a machine-reader "sees" different elements (bars or spaces in a one-dimensional barcode) relative to one another as well as the light and dark features (e.g., the modules) of two-dimensional barcodes as represented by reflectance values. For the same element, readers usually "see" spaces narrower than bars, and they also see narrow elements as being less distinct than wide ones. A scan reflectance profile typically shows narrow spaces being less intense or not as reflective as wide spaces, and narrow bars as being less dark than wide bars.

In accordance with various embodiments, identifying a print quality problem may comprise identifying a defect in the printed barcode. Defects are irregularities in bars, spaces and quiet zones of one-dimensional barcodes and irregularities in the light and dark features of two-dimensional barcodes (e.g., a "spot" in a space or a "void" in a bar). Defects are measured based upon the relationship between the largest defect in the symbol (printed barcode) and the symbol contrast ($ERN_{max}$/SC, wherein $ERN_{max}$=Element Reflectance Non-uniformity and SC=Symbol Contrast). The smaller the defect, the better the defect grade.

Figure 8D:
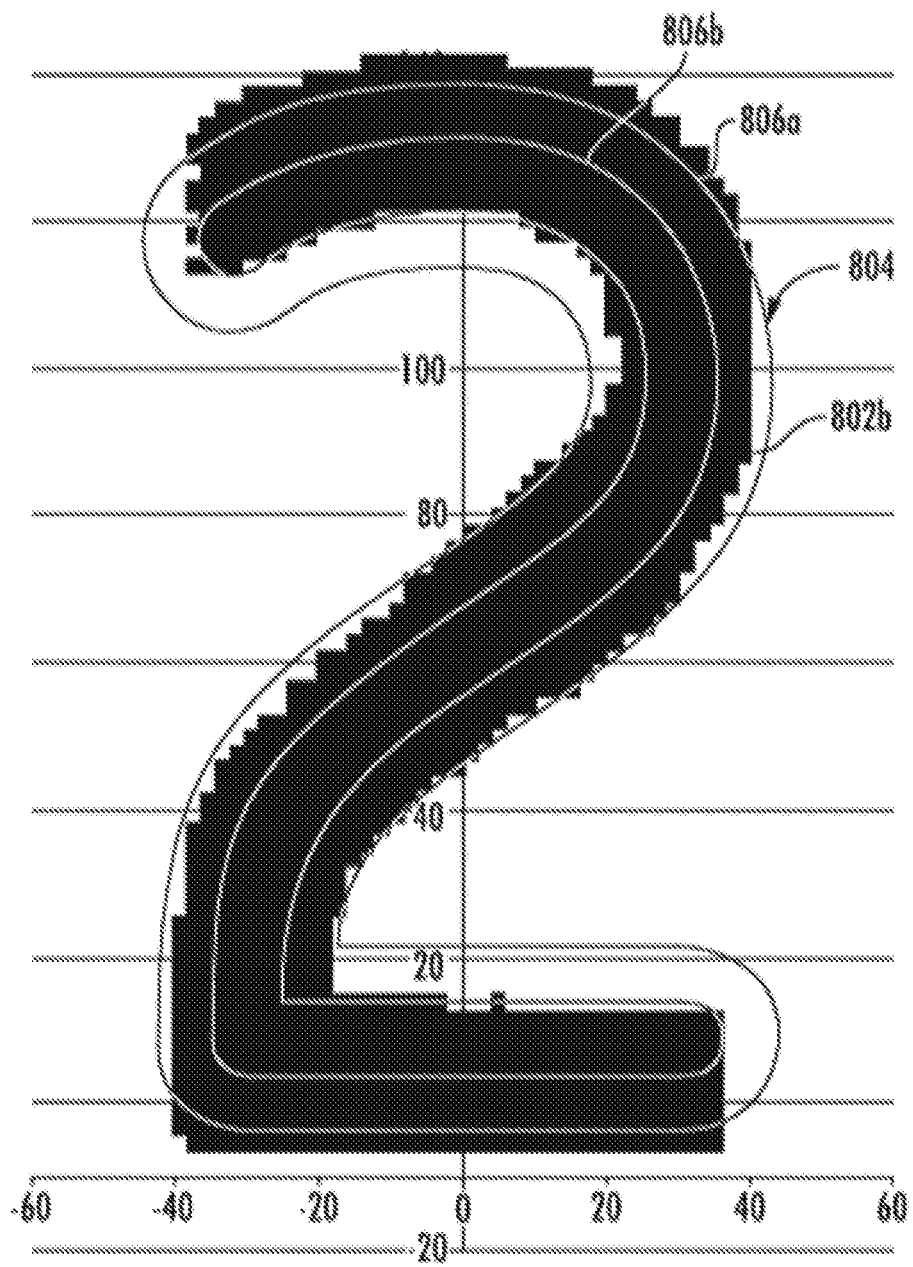
FIGS. 8D, 8E, and 8F graphically depict exemplary print quality problems of the printed OCR-B character of FIG. 8A, according to various embodiments of the present invention.
Figure 8E:
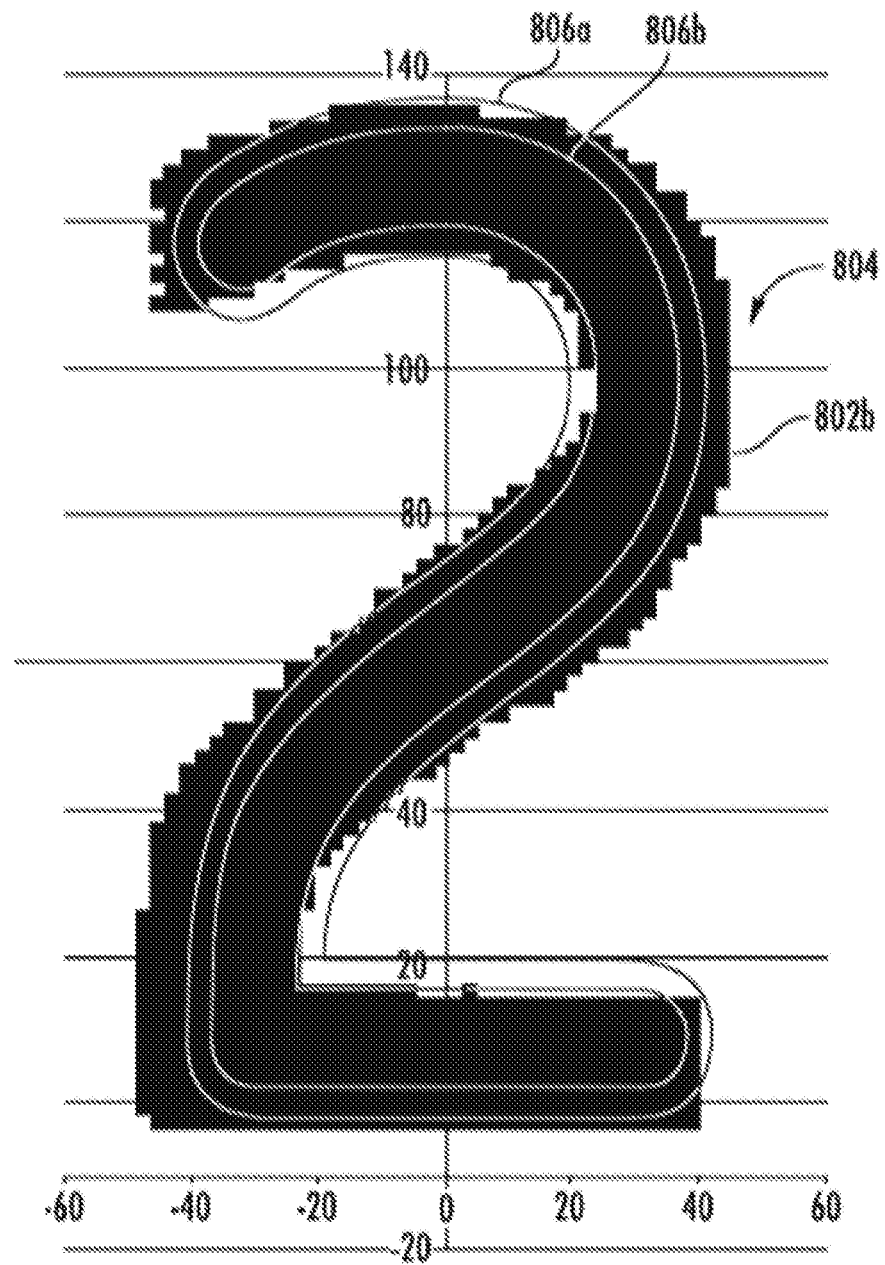
Figure 8F:
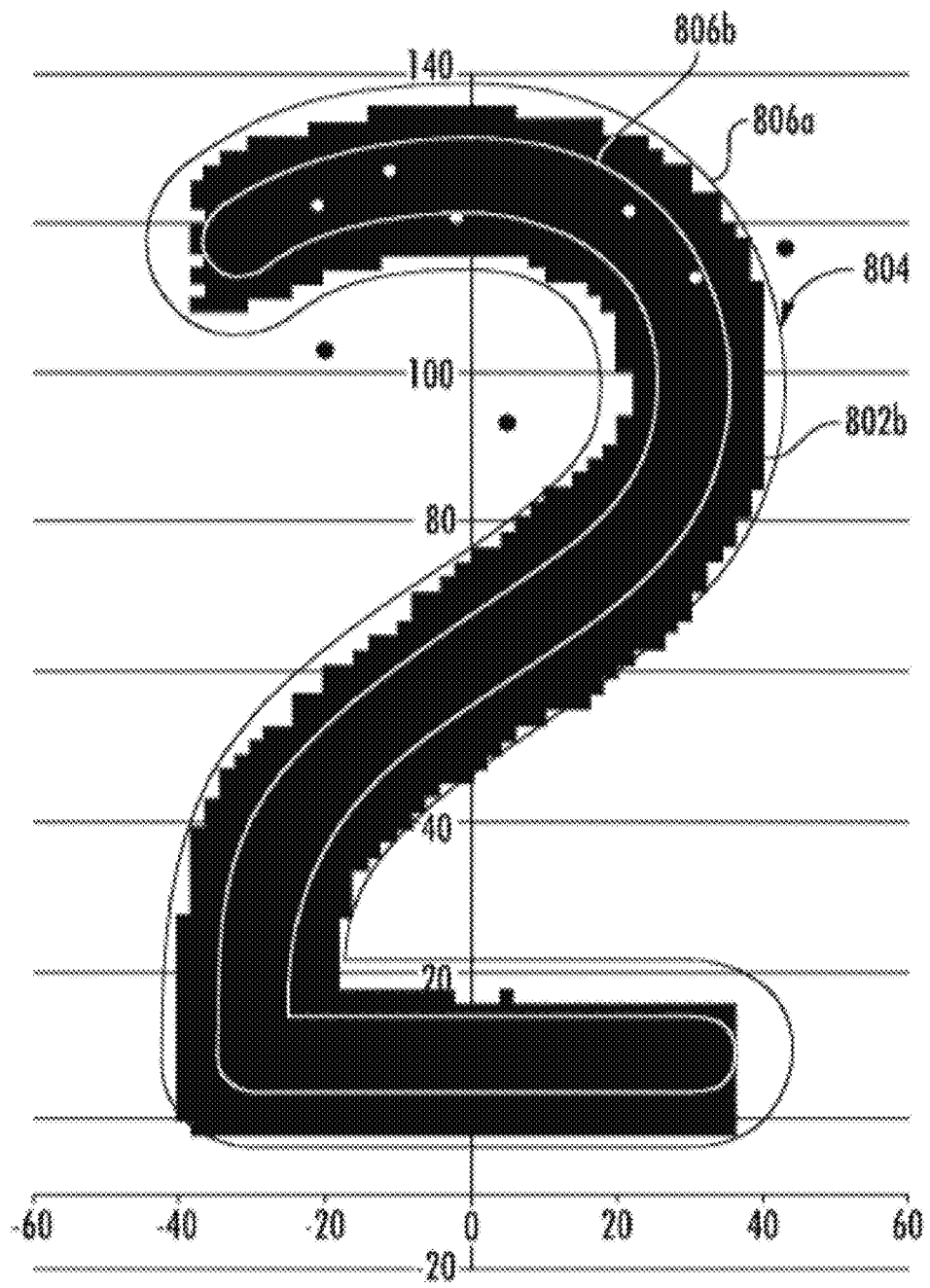

Referring now to FIGS. 8D, 8E, and 8F, according to various embodiments of the present invention, identifying a print quality problem in a printed OCR-B character comprises identifying that the printed OCR-B does not conform with the Stroke Width Template as described in ISO/IEC standard 30116.

For example, FIG. 8D depicts a printed OCR-B character identified as having a print quality problem because the character exceeds the outer character boundary 806a (top and bottom of the character) of the Stroke Width Template. While a printed OCR-B character exceeding the outer character boundary 806a of the Stroke Width Template is shown as an example of a printed OCR-B character identified as having a print quality problem, it is to be understood that a printed OCR-B character that is short of the outer character boundary 806a may also be identified as having a print quality problem.

FIG. 8E depicts an exemplary printed OCR-B character that exceeds the outer character boundary 806a of the Stroke Width Template in different locations (left and right) than the printed OCR-B character of FIG. 8D.

FIG. 8F depicts an exemplary printed OCR-B character identified as having a print quality problem because of white "voids" inside the inner character boundary 806b of the Stroke Width Template and black "spots" outside the outer character boundary 806a of the Stroke Width Template (collectively referred to as "defects"). These and other non-conformities of the printed OCR-B character with the Stroke Width Template described in ISO/IEC 30116 standard are recognized print quality problems that may occur in a printed OCR-B character.

Referring back to FIG. 7, in accordance with various embodiments of the present invention, the method 700 for controlling print quality of a printed barcode from a printer may further comprise generating a notice to a user of the printer indicating that a print quality problem has been identified (step 708). While step 708 is depicted in FIG. 7 as being performed immediately after step 706, it is to be understood that the notice may be generated at any time following identification of the print quality problem (e.g., before printing of the next machine-readable indicium or after any of steps 710, 712, 714, 716, and 718). The notice may be provided to the user in any manner.

Still referring to FIG. 7, according to various embodiments of the present invention, the method 700 for controlling the print quality of the machine-readable indicium from the printer continues by determining a prescribed corrective action to substantially correct the (identified) print quality problem (step 710) in the next machine-readable indicium. Determining the prescribed corrective action comprises retrieving association data (from a memory of the printer, a memory of the verifier, or both, or from a memory of the printer/printer-verifier 600) that associates different print quality problems with a respective prescribed corrective action.

For example, a modulation problem in the printed barcode having both a picket fence orientation and a ladder orientation may be associated with the prescribed corrective action of adjusting the printhead temperature and adjusting the speed of the printer. A modulation problem in the printed barcode having a picket fence orientation may be associated with the prescribed corrective action of adjusting the printhead temperature. A modulation problem in the printed barcode having a ladder orientation may be associated with the prescribed corrective action of adjusting the print speed. A defects problem may be associated with a prescribed corrective action of changing the print media (e.g., to a higher quality print media) for the next printed barcode.

The prescribed corrective action associated with the modulation problem improves the modulation grade of the next printed barcode. The prescribed corrective action associated with the defect problem improves the defect grade.

As used herein, improvement in the modulation grade and/or defects grade comprises "substantial correction" of the print quality problem. A print quality problem in the printed OCR-B character (such as depicted in FIG. 8D) may be associated with the prescribed corrective action of adjusting the print speed. A print quality problem in the printed OCR-B character such as depicted in FIG. 8E may be associated with the prescribed corrective action of adjusting printhead temperature and the print speed. A print quality problem in the printed OCR-B character such as depicted in FIG. 8F may be associated with the prescribed corrective action of changing the print media (e.g., to a higher quality print media) for the next printed barcode. While modulation problems and defect problems of printed barcodes and print quality problems of printed OCR-B characters have been described, it is to be understood that machine-readable indicia may have other print quality problems that are controlled according to various embodiments of the present invention. Similarly, the prescribed corrective actions may be other than those described.

Referring back to FIG. 7, according to various embodiments of the present invention, the method 700 for controlling the print quality of the machine-readable indicium from the printer continues by automatically causing implementation of the prescribed corrective action such that a next machine-readable indicium does not have the print quality problem (i.e., the print quality problem is substantially corrected in succeeding machine-readable indicia) (step 712).

For example, if a modulation problem in the printed barcode in both a picket fence orientation and in a ladder orientation is identified in step 706, the processor in the printer, the verifier, or both, or the processor in the printer-verifier causes automatic adjustment of the printhead temperature and the speed of the printer. If a modulation problem is identified in the printed barcode in the picket fence orientation only, the processor in the printer, the verifier, or both, or the processor in the printer/printer-verifier 600 causes automatic adjustment of the printhead temperature. The printhead temperature may be either reduced or increased, depending upon the specifics of the modulation problem identified. If poor modulation results from bars that are too light, i.e., high up in the Scan Reflectance profile (as defined, for example, in 15416 barcode print quality test specification), then an increase in printhead temperature is implemented. If the bars are too dark, i.e., near the bottom of a Scan Reflectance Profile, a reduction of printhead temperature is implemented. If the identified modulation problem is in a ladder orientation only, the processor in the printer, the verifier, or both, or the processor in the printer-verifier causes automatic adjustment in print speed. The print speed may either be reduced or increased. If the identifying step results in identifying a defect problem in the printed barcode, causing implementation of the prescribed corrective action comprises communicating to a user of the printer to change the print media (e.g., to a higher quality print media) for the next printed barcode.

If the identifying step 706 results in identifying a print quality problem in the OCR-B character, the prescribed corrective action that is caused to be implemented depends upon the specific non-conformity of the printed OCR-B character. For example, as noted above, the prescribed corrective action when the printed OCR-B character that exceeds (or is short of) the outer character boundary of the Stroke Width Template (such as depicted in FIG. 8D) is an automatic adjustment in print speed. The processor in the printer, the verifier, or both, or the processor in the printer-verifier causes the automatic adjustment in print speed. The print speed may either be reduced or increased. As noted above, the prescribed corrective action when the printed OCR-B character exceeds the outer character boundary on the left and right (e.g., FIG. 8E) is an automatic adjustment of the printhead temperature and the speed of the printer by the processor in the printer, the verifier, or both, or the processor in the printer-verifier. As noted above, the prescribed corrective action when the printed OCR-B character has voids and spots (i.e., "defects") such as depicted in FIG. 8F is the same as that for substantially correcting a defect problem in a printed barcode as above described. In accordance with various embodiments of the present invention, the method 700 may stop after step 712 (i.e., before data generation, collection and/or storage).

Returning to FIG. 7, according to various embodiments of the present invention, the method 700 for controlling the print quality of the machine-readable indicium from the printer may continue by generating data from controlling the print quality of the machine-readable indicium (step 714). Data may be generated from the evaluation of each machine-readable indicium. The data may include information about corrective actions that were implemented. The data may be collected and analyzed, for purposes as hereinafter described.

Still referring to FIG. 7, according to various embodiments of the present invention, the method 700 for controlling the print quality of the machine-readable indicium from the printer continues by at least one of updating the association data with the data (step 716) and collecting and storing the data for use in long-term printing process control (step 718). The data may be plotted for analyzing trends. Using the data for long-term printing process control helps maintain print quality of the machine-readable indicia by the same printer into the future. The data provides information as to how the printer is performing and the condition of the printer and its components. For example, the data may be used to track ink spread (also called bar or space growth, element variation, heat spread), i.e., the average width of the bars compared to the average width of the spaces in printed barcodes. For example, if the average width of the bars is slightly larger than the average width of the spaces by 7%, then it can be stated that the ink spread is 7%. An increase in ink spread over time indicates a need to change the printhead. By keeping track of the corrective actions (i.e., adjustments) over time, it may be possible to determine, for example, the end of life for the printhead.

Still referring to FIG. 7, according to various embodiments of the present invention, the method 700 for controlling the print quality of the machine-readable indicium from the printer may further comprise generating at least one diagnostics report from the collected data (step 720). The diagnostics report may be used for long-term process control to assess the condition of the printer.

Still referring to FIG. 7, according to various embodiments of the present invention, the method 700 for controlling the print quality of the machine-readable indicium from the printer comprises repeating the capturing and evaluating steps for each machine-readable indicium (step 722). Step 722 may be performed immediately after step 705 if no print quality problem is detected (i.e., identified) from the evaluation step 704 or immediately after the prescribed corrective action has been implemented (i.e., immediately after step 712). In this way, the print quality of each machine-readable indicium is continually monitored.

A print quality problem in the machine-readable indicium may be identified and automatically (substantially) corrected (at least for modulation problems and some print quality problems in printed OCR-B characters) ideally before a next machine-readable indicium is printed or shortly thereafter, thereby substantially preventing the generation of multiple unusable printed medium. The print quality of each machine-readable indicium may be evaluated immediately after an image thereof has been captured, with the prescribed corrective action automatically implemented as soon as the machine-readable indicium is identified as having the print quality problem. As a result, there is a continual adjustment to achieve optimal print quality in each machine-readable indicium, with the identified print quality problem substantially corrected in succeeding machine-readable indicia including the next printed machine-readable indicium.

From the foregoing, it is to be understood that various embodiments of the present invention control the print quality of machine-readable indicia such as printed barcodes and printed OCR-B characters. Various embodiments enable automatic implementation of the prescribed corrective action for the print quality problem as soon as the print quality problem is identified in the machine-readable indicium. As a result, the print quality problem is substantially corrected in succeeding machine-readable indicia from the same printer.

B. Providing Print Quality Feedback

Although many printing applications do not necessarily require a high quality of printing, there are some applications in which the print quality is particularly important. For example, when printing barcodes, the print quality of barcodes must meet standards ISO/IEC 15415 and ISO/IEC 15416, among others. Even when verifying the quality of barcodes, barcode verifiers must meet standards ISO/IEC 15426-1 and ISO/IEC 15426-2, among others.

To determine print quality, verifiers may use a gray-level print quality analysis (often called "ANSI grading"). When an error is detected, verifiers may provide a simple message to communicate that an error has been detected. For example, the verifiers may simply print "VOID" on the barcode or display an error message on a display screen of the printer or printer verifier.

There is a need for systems and methods to provide more information. By communicating more information to a user, the user can more easily maintain the printers and printer verifiers to keep the devices operating properly. In accordance with various embodiments, the present invention provides systems and methods of improving the process of verifying print quality. In addition to the indication of "failure" or "success," the present invention further provides a great amount of information when the verification test results in a failure. In other words, the present invention provides more feedback than just a 'VOID' message as there may be many different levels of quality that could generate a failure. In addition to the notice that the label fails, the present invention prints useful information about what to do about the failure.

Not only do the verifiers of the present disclosure determine print quality, the verifiers are also further configured to print information onto the print media or label when the print quality does not meet an acceptable threshold. Printing the information communicates the reasons why the print quality is not acceptable, and can also provide information on how a user can correct or improve the print quality. Otherwise, with only a simple notification that the printer has failed a verification test, the user may not know how to correct the issues that caused the failure, and the printer may continue to print out defective products. The present invention provides detailed information that can be printed directly onto the labels so that the user can have a record of the error and instructions about how to fix the error.

Figure 9:
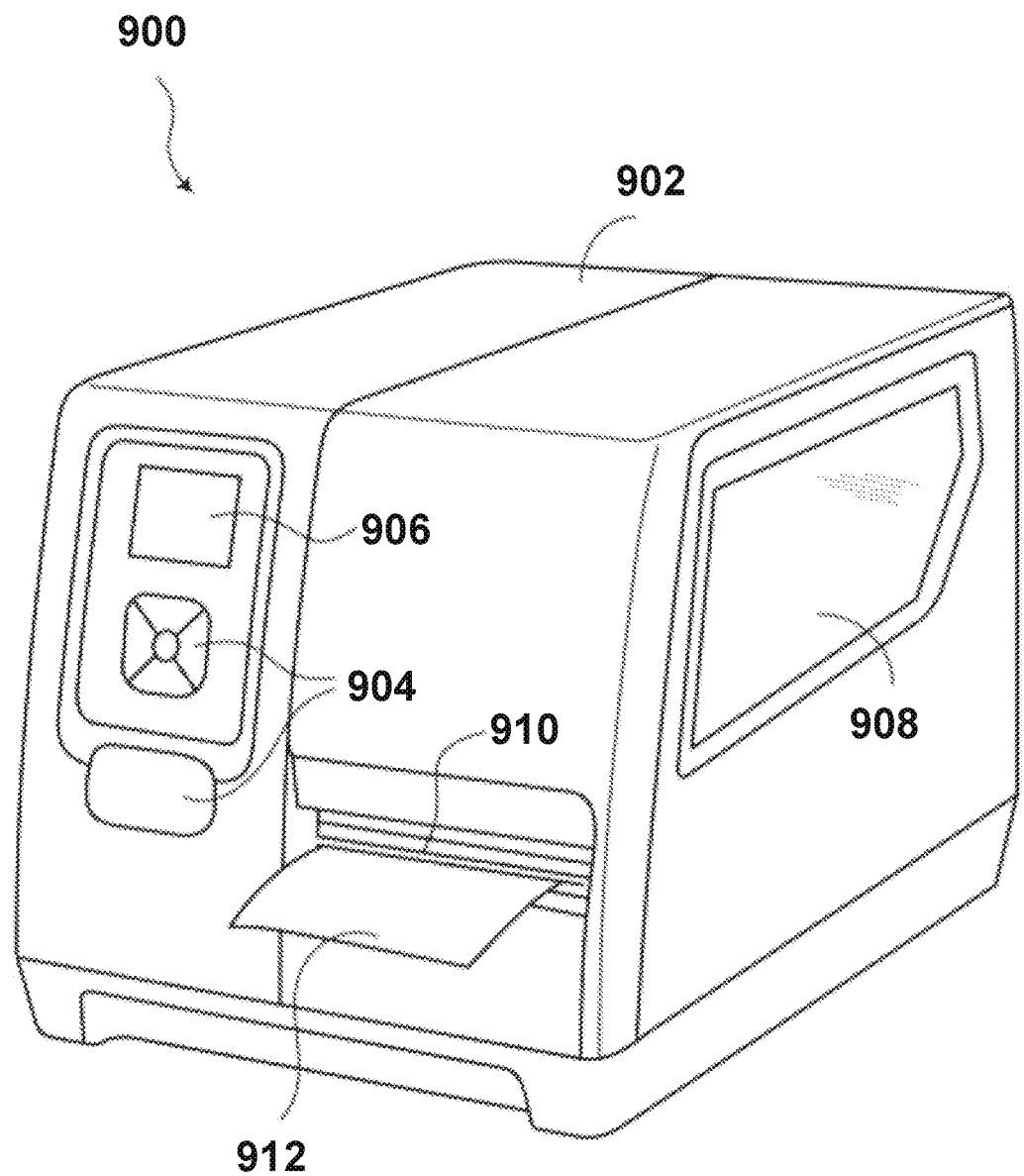
FIG. 9 schematically depicts a perspective view of a label printer, according to various embodiments of the present invention.

FIG. 9 is a perspective view illustrating an embodiment of a label printer 900. In various embodiments of the present invention, the label printer 900 is similar to the printer described above with reference to FIGS. 3-6. The label printer 900 includes a housing 902, one or more user input components 904, one or more user output components 906, a viewing window 908, and a label output port 910. FIG. 9 illustrates a label 912 exiting the label output port 910 of the label printer 900.

Similar to the embodiments described above in connection with FIGS. 3-6: in some embodiments, the label printer 900 may be configured to include a verifier positioned inside the housing 902; in some embodiments, a verifier may be positioned at or around the label output port 910; in some embodiments, a verifier may be independent of the label printer 900 and configured to conduct verification tests after the labels 912 have exited the label printer 900.

The verifier associated with the label printer 900 may be configured to analyze the print quality of images printed onto the labels. The verifier may further compare the analyzed print quality with certain quality standards, such as ISO/IEC 15415, ISO/IEC 15416, ISO/IEC 15426-1, ISO/IEC 15426-2, ANSI X3.182, among others. If the print quality does not meet the standards or contains parameters that fall below a minimum acceptable threshold, then the verifier can print diagnostic information onto the label.

For example, the diagnostic information may include gray levels, ANSI grade levels, numeric ANSI grades, and/or bar width growth percentages. The diagnostic information may also include instructions defining an appropriate course of action that a user may take for correcting any issues. The corrective actions may include, for example, changing the pressure of a printhead of a printing mechanism. The printhead pressure is the pressure applied by the printhead to the print media that is supported by a platen roller or other printing surface. Other corrective actions may include reducing the temperature of the printhead, cleaning the printhead, repairing the printhead, replacing the printhead, realigning the print media within the printer, realigning a printer ribbon within the printer, and/or other actions.

Figure 10:
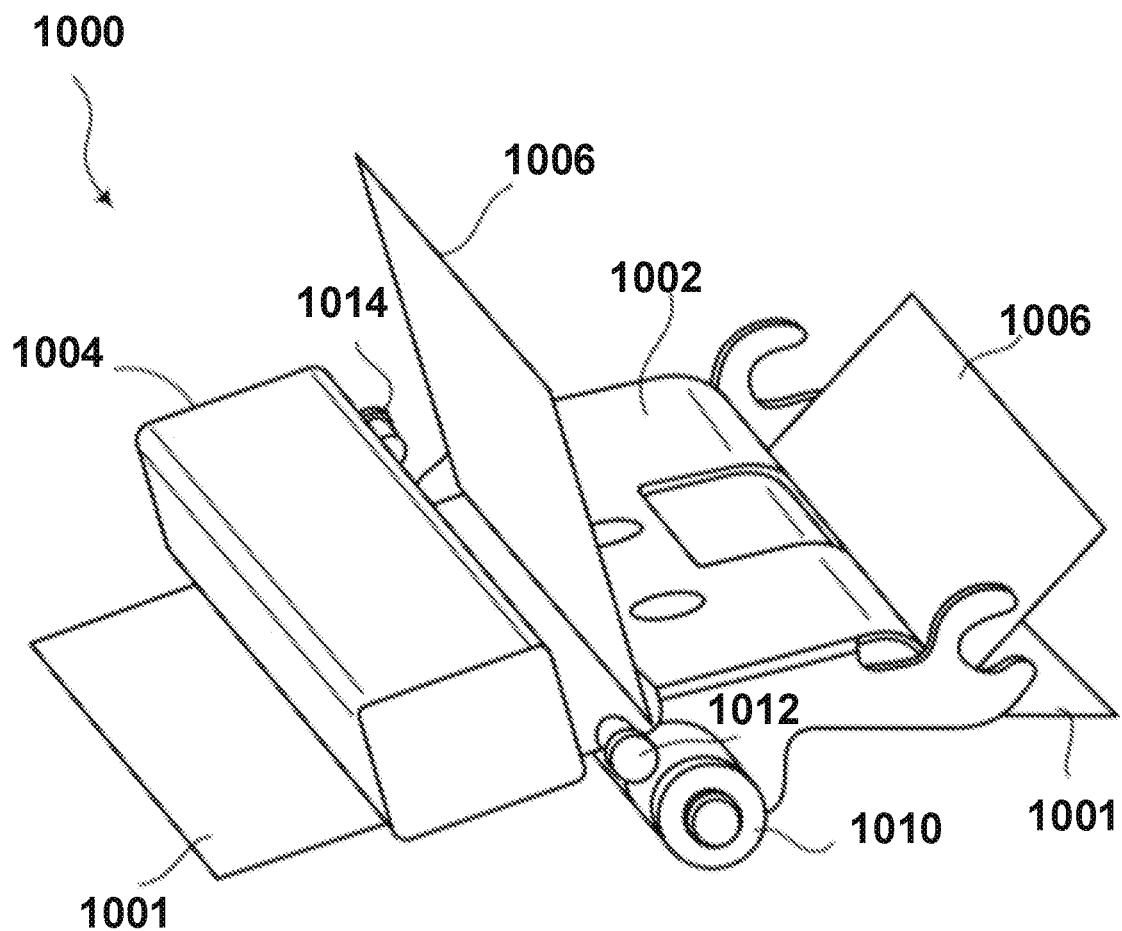
FIG. 10 schematically depicts a perspective view of a printing and verifying apparatus, according to various embodiments of the present invention.

FIG. 10 is a perspective view illustrating an embodiment of a printing and verifying apparatus 1000 representing at least a portion of the interior components of the label printer 900, similar to the printer/printer-verifier 600 as described above with reference to FIG. 6. In general, the printing and verifying apparatus 1000 comprises a printing mechanism 1002 and a print verification device 1004. In this embodiment, these components may be incorporated entirely within the housing 902 of the label printer 900 of FIG. 9. The printing mechanism 1002 utilizes an ink ribbon 1006 for the thermal transfer of ink to print media 1001 as the print media 1001 passes through the printing mechanism 1002. The printing mechanism 1002 includes a platen roller 1010 configured for moving the ink ribbon 1006 and print media 1001 through the printing and verifying apparatus 1000. Also, the platen roller 1010 provides a surface for supporting the print media 1001 when the printing mechanism 1002 applies ink to the print media 1001. Ionizers 1012 and 1014 are positioned on opposite sides of the print media 1001 as it passes through the printing and verifying apparatus 1000.

Some verifiers may determine information regarding the ANSI grades (for example, by evaluating the gray-level image to a standard such as ISO/IEC 15415 and 15416). That information may be stored in a digital file for later retrieval or displayed temporarily on a computer screen. With the configuration of FIG. 10 (in which the print verification device 1004 is located in proximity to the printing mechanism 1002), the print verification device 1004 may instruct the printing mechanism 1002 to immediately print the diagnostic information onto the same label that is being printed. In some embodiments, the print verification device 1004 may instruct the platen roller 1010 to retract the print media 1001 to print the diagnostic information.

In the present invention, detailed print quality information and/or diagnostic information can be printed directly on a failed label. Examples of useful information that can be printed on the label may include (1) an ANSI grading level (e.g., "A"-"F"), (2) a numeric ANSI grade level (e.g., from 0.0 to 4.0), and (3) bar width growth (e.g., +5.9%).

In accordance with various embodiments, the present invention may further provide information to the user as to what to do about a failed label. For instance, in high-impact printing installations (such as pharmaceutical labeling), it may be necessary to stop all printing on a specific label printer if a failed label is detected. In this case, the printing and verifying apparatus 1000 may print a message on the label such as "Stop the Printer and Notify your Supervisor."

In another embodiment, process-specific information is provided. For example, if a parameter of a label exceeds a given threshold (e.g., bar width growth>10%), the printing and verifying apparatus 1000 can print a message to instruct the user to adjust the printer. For instance, a message printed on the failed label may read "Reduce Printhead Temperature Slightly." Similarly, if the reason for failure is in the Defects Grade, the message printed on the label may be "Stop Printing and Clean Printhead."

In another embodiment, the printing and verifying apparatus 1000 may detect burned-out dots in the printhead of the printing mechanism 1002 based on the analysis of the print quality. Burned-out dots may be detected by comparing sequential scan grades of a linear bar code symbol or by other methods. If printhead dot failure is detected, the print verification device 1004 may use a certain threshold, which could be a predetermined threshold or set by the user for a particular use. For example, the burned-out dot threshold could be as low as one defective dot or may be as high as a maximum number that still allows acceptable results. Therefore, if the printhead exceeds the threshold, the printhead would be considered defective and in need of repair or replacement. The burned-out dot threshold may alternatively include a maximum number of adjacent defective dots, such as two or three adjacent defective dots. If one of these thresholds is exceeded, the printing mechanism 1002 may print a message such as "Printer Maintenance Required" or "Replace the Printhead" depending on the environment and/or the level of operator competency.

As described above, when the user is presented with useful barcode quality information from the integrated printing and verifying apparatus 1000, the user can better understand the printing issues so that he can act on the knowledge of barcode print quality. Receiving appropriate feedback enables the user to more easily analyze why the printer is producing unacceptable labels. In some embodiments, the feedback may include instructions regarding the appropriate course of corrective action by communicating with the user by instructions that can be printed directly on the failed label.

Therefore, according to some embodiments, a printer (e.g., the label printer 900) may comprise the printing mechanism 1002 configured to print images onto print media 1001. The printer may further comprise a print verification device 1004 configured to monitor the print quality of images printed onto the print media. The print verification device 1004 may be configured to analyze the print quality to determine if the print quality meets predetermined quality standards. When the print verification device 1004 determines that the print quality does not meet the predetermined quality standards, the print verification device 1004 may instruct the printing mechanism 1002 to print diagnostic information onto the print media.

In response to receiving the instruction to print the diagnostic information, the printing mechanism 1002 may be configured to print the diagnostic information onto the print media 1001. For example, the printing mechanism 1002 may print the diagnostic information on the same label that is determined to be defective. Printing on the same label may include printing an image over the printed barcode information. In other embodiments, when the defect is detected after the label has passed through the printing mechanism 1002, the printing mechanism 1002 may print the diagnostic information on the next label after the defective one. Some embodiments may also include a process of retracting the defective label by reversing the rotation of the platen roller 1010 and printing the diagnostic information on top of the printed images of the defective label.

As mentioned above, the diagnostic information may include information regarding a level of print quality. The diagnostic information may include gray levels, ANSI grade levels, numeric ANSI grades, and/or a bar width growth percentage. The print verification device 1004 may be configured to utilize the diagnostic information for comparison purposes to detect errors in the print quality.

As mentioned above, the diagnostic information may include maintenance instructions defining at least one user action to improve or correct the print quality. For example, the at least one user action may include changing the pressure that a printhead of the printing mechanism 1002 applies to a print media that is supported by a platen roller or other printing surface, reducing the temperature of the printhead when the bar width growth is greater than a predetermined percentage, cleaning the printhead when a defects grade failure is determined, repairing or replacing the printhead when a dot failure exceeds a predetermined threshold, realigning the print media 102 within the printer, and/or realigning the ink ribbon 1006 within the printer.

As mentioned above, the print media 1101 may include at least one blank label on which images are printed. The printed images may include at least one barcode. When the print verification device 1004 determines that the print quality does not meet the predetermined quality standards, the printing mechanism 1002 may be configured to print the diagnostic information over the at least one barcode. In some embodiments, the diagnostic and/or quality grading information may be printed on the media as a bar code symbol or other type of symbology.

Figure 11:
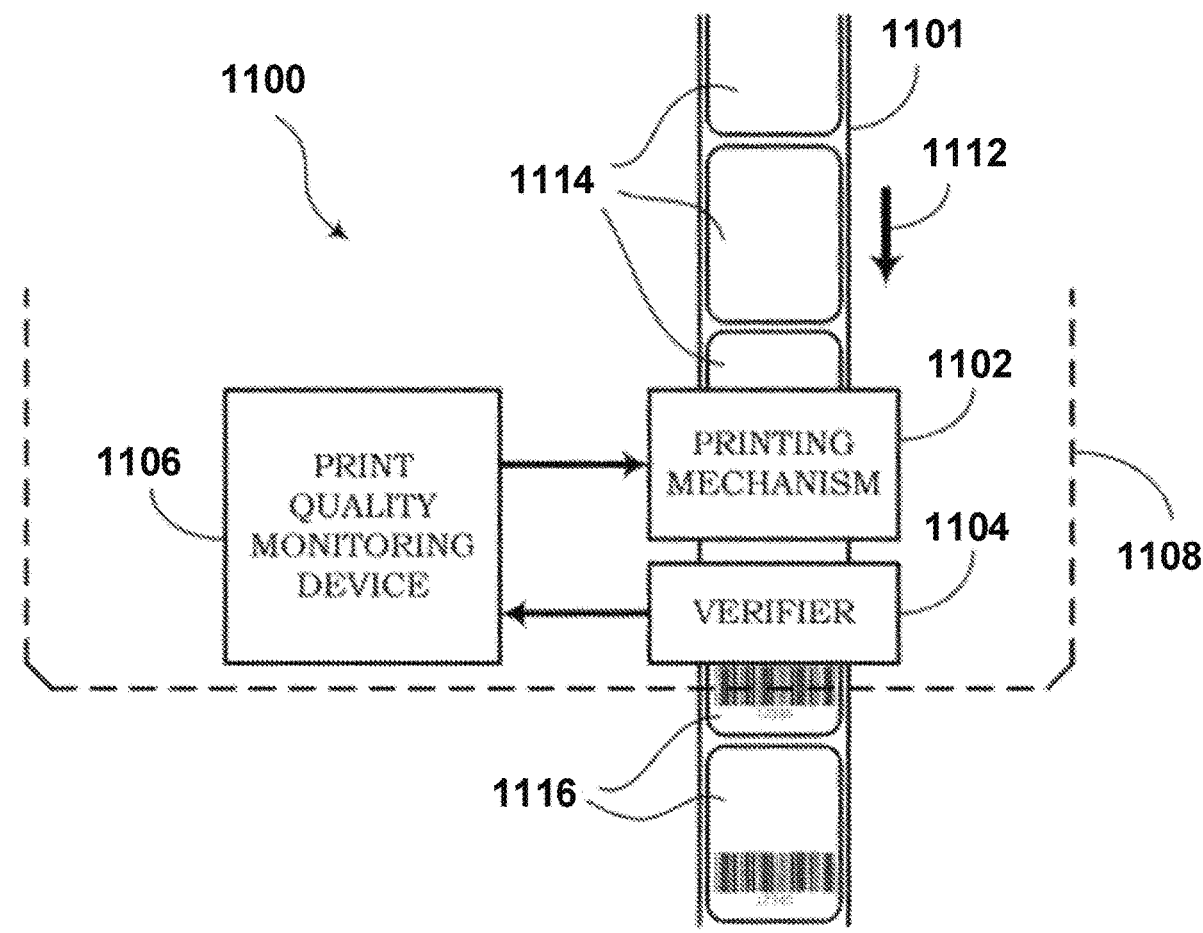
FIG. 11 schematically depicts a block diagram of a printing and verifying device, according to various embodiments of the present invention.

FIG. 11 is a block diagram showing an embodiment of a printing and verifying device 1100. The printing and verifying device 1100 comprises a printing mechanism 1102, a verifier 1104, and a print quality monitoring device 1106. It should be noted that these elements may be disposed completely or partially inside a housing 1108 of a printer. In some embodiments, the verifier 1104 may be incorporated into the structure of the housing 1108 itself or positioned at or near an output port of the printer. The verifier 1104 may be a contact image sensor (CIS) device, a 1D or 2D image sensor, a scanner, or other device for capturing the images printed on the print media 1001.

The printing and verifying device 1100 is configured such that the printing mechanism 1102 and the verifier 1104 comprising a contact image sensor (CIS) device are positioned adjacent to or near each other. In this way, the sensing or scanning of the print quality can take place immediately after the printing mechanism 1102 prints images onto the labels. The CIS device senses or scans images of the labels and forwards sensor signals to the print quality monitoring device 1106, which acts as a control device. The print quality monitoring device 1106 processes the sensor signals to determine print quality and provides feedback to the printing mechanism 1102.

In operation, print media 1101 is fed through the printer in the direction of arrow 1112, as shown in FIG. 11. The print media 1101 may include blank labels 1114 onto which the printing mechanism 1102 prints images onto blank labels 1114 to produce printed labels 1116 that are fed through an output port of the printer.

The print quality monitoring device 1106 may be configured to monitor a variety of possible issues. For example, the print quality monitoring device 1106 may detect ribbon wrinkle, stained print media, damaged print media, defective print media, printing lapses, and/or barcode width variations. After analysis, the print quality monitoring device 1106 may provide signals to the printing mechanism 1102 to control the printing mechanism 1102 to print diagnostic information onto the labels 1114.

In some embodiments, the print media 1101 may include an embedded radio frequency identification (RFID) tag on each label 1114. The printing and verifying device 1100 may be configured with an RFID writing device configured to write or encode the diagnostic and/or quality information into the embedded RFID tags. For example, the RFID writing device may be incorporated in the printing mechanism 1102 or may be a separate component positioned elsewhere in the housing 1108.

Figure 12:
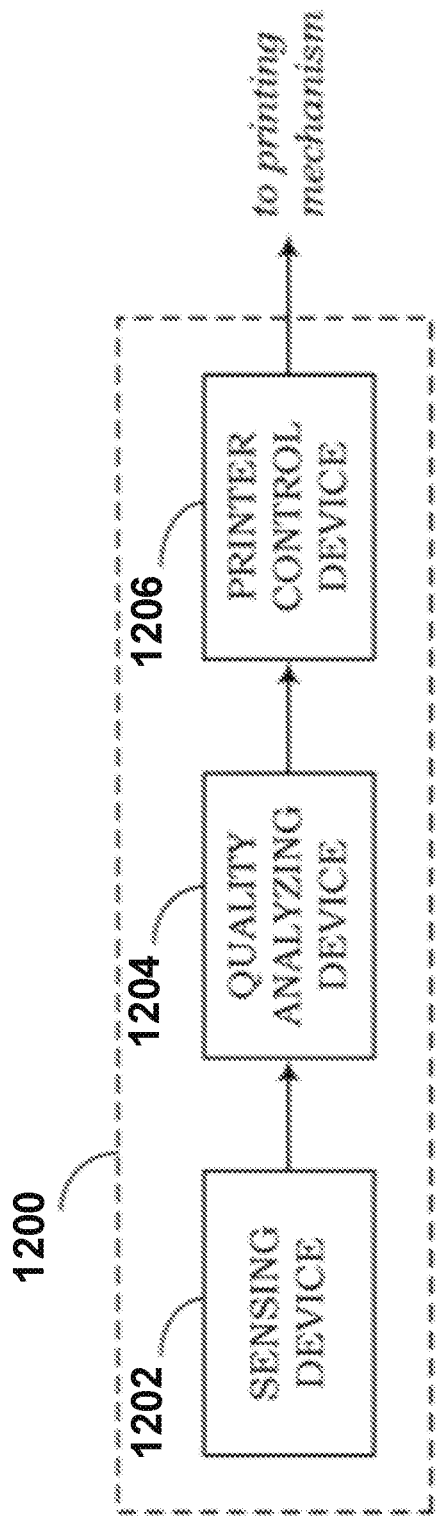
FIG. 12 schematically depicts a block diagram of a print verification device, according to various embodiments of the present invention.

FIG. 12 is a block diagram illustrating an embodiment of a printer verification device 1200. The printer verification device 1200 may contain the same or similar features as the print verification device 1004 shown in FIG. 10 and/or the print quality monitoring device 1106 shown in FIG. 11. In this embodiment, the printer verification device 1200 includes a sensing device 1202, a quality analyzing device 1204, and a printer control device 1206.

The sensing device 1202 is configured to sense or scan images printed on a label and/or obtain sensed image signals. The image information is transmitted to the quality analyzing device 1204, which is configured to analyze the print quality of the images. The analysis conducted by the quality analyzing device 1204 may include comparing the characteristics of the printed images with certain quality standards or thresholds. Also, the quality analyzing device 1204 may determine whether the printed image meets the standards and/or are acceptable based on comparisons with quality threshold levels.

In some embodiments, the printer verification device 1200 may comprise the sensing device 1202 within a printer to optically sense or scan an image printed onto print media 102. The quality analyzing device 1204 may be configured to analyze the print quality of the image printed onto the print media. The printer control device 1206 may be configured to instruct a printing mechanism (e.g., printing mechanism 1002, 1102) to print diagnostic information onto the print media when the quality analyzing device 1204 determines that the print quality does not meet predetermined quality standards.

As mentioned above, the diagnostic information provided by the printer verification device 1200 may include any suitable information that can be helpful for maintenance or repair purposes. For example, the diagnostic information may include gray levels, ANSI grade levels, numeric ANSI grades, bar width growth amounts, and/or other parameters. The quality analyzing device 1204 may be configured to utilize the diagnostic information to detect errors in the print quality. The diagnostic information provided by the printer control device 1206 may include instructions defining an appropriate course of corrective actions. The corrective action performed by a user or maintenance worker may include changing the pressure that a printhead of the printing mechanism 1102 applies to a print media, reducing the temperature of the printhead, cleaning the printhead, repairing the printhead, replacing the printhead, realigning the print media 102 within the printer, and/or realigning a printer ribbon within the printer.

The print media may include at least one label and the image printed on the label may include at least one barcode. The printer verification device may be further configured such that the quality analyzing device 1204 determines if the print quality meets the predetermined quality standards. The printer control device 1206 instructs the printing mechanism (e.g., printing mechanism 1002, 1102) to print the diagnostic information over the image printed onto print media (e.g., print media 1001, 1101) when the print quality does not meet the quality standards.

FIGS. 13A-13D illustrate an example of a label 1300 that is printed according to the teachings disclosed herein. In this example shown in FIGS. 13A-13D, the label 1300 is fed through the printer in a manner such that the bottom end of the label 1300 is printed first and the top end of the label is printed last. In other words, the label is fed through the printer bottom first, such that, according to this example, the barcode or barcodes 1302 are printed before the user information 1304 (shown in its entirety in FIG. 13A) is printed. The user information 1304 may include any text, numbers, etc. that may be specific to the business or individual for which the labels are printed.

Figures 13A, 13B:
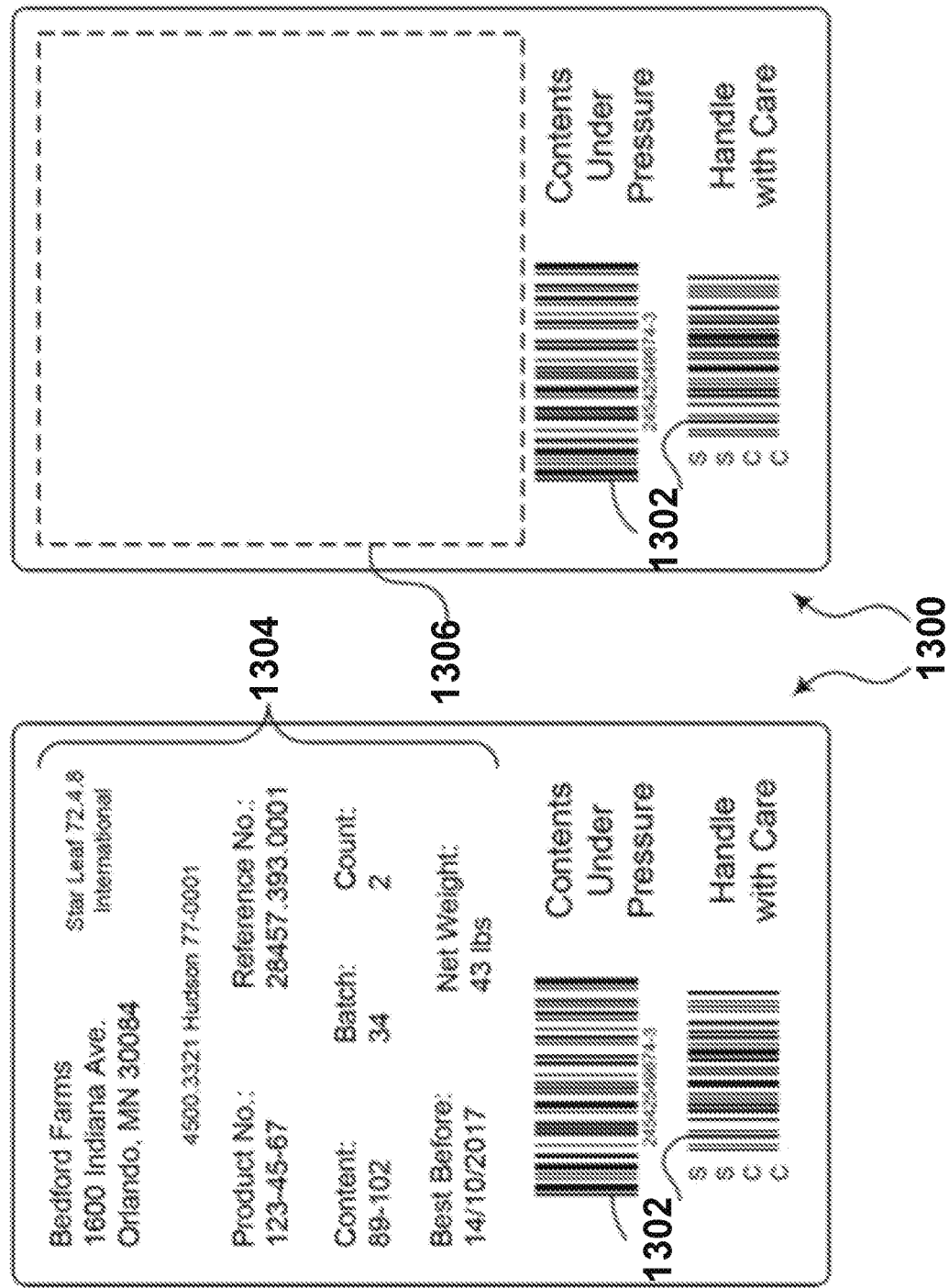
FIGS. 13A, 13B, 13C, and 13D schematically depict views of an exemplary printed label analyzed by a verifying device, according to various embodiments of the present invention.

In FIG. 13A, the label 1300 is shown as being printed as the user intends for it to be printed. In some embodiments, it may be considered that FIG. 13A shows the label 1300 that conforms to the verification tests disclosed herein, without any error messages needed.

FIG. 13B shows the label 1300 in which only the barcodes 1302 are printed, while the user information 1304 shown in FIG. 13A is either not printed during a first pass of the label through the printer or has not yet been printed. In this condition, the label 1300 includes a blank area 1306 where the user information 1304 normally would be. The label 1300 may appear this way after only a portion of the label 1300 has passed through the printing mechanism or after the label 1300 has been printed with the blank area 1306 intentionally left blank.

A verifying device may be positioned such that it can verify the barcodes 1302 immediately after the barcodes 1302 are printed and before the rest of the label 1300 is printed. Similarly, the print quality monitoring device 1106 or quality analyzing device 1204 can determine if the barcodes 1302 meet the quality standards. The print quality can therefore be analyzed before the rest of the label 1300 is fed through the printer or during a pause in the feeding process if extra time is needed to analyze the quality. If it is determined that the quality does not meet the standards, then the print quality monitoring device 1106 or printer control device 1206 can change the image buffer of the printer on the fly so that the label 1300 is printed with an error message 1308 in place of the user information 1304.

Figures 13C, 13D:
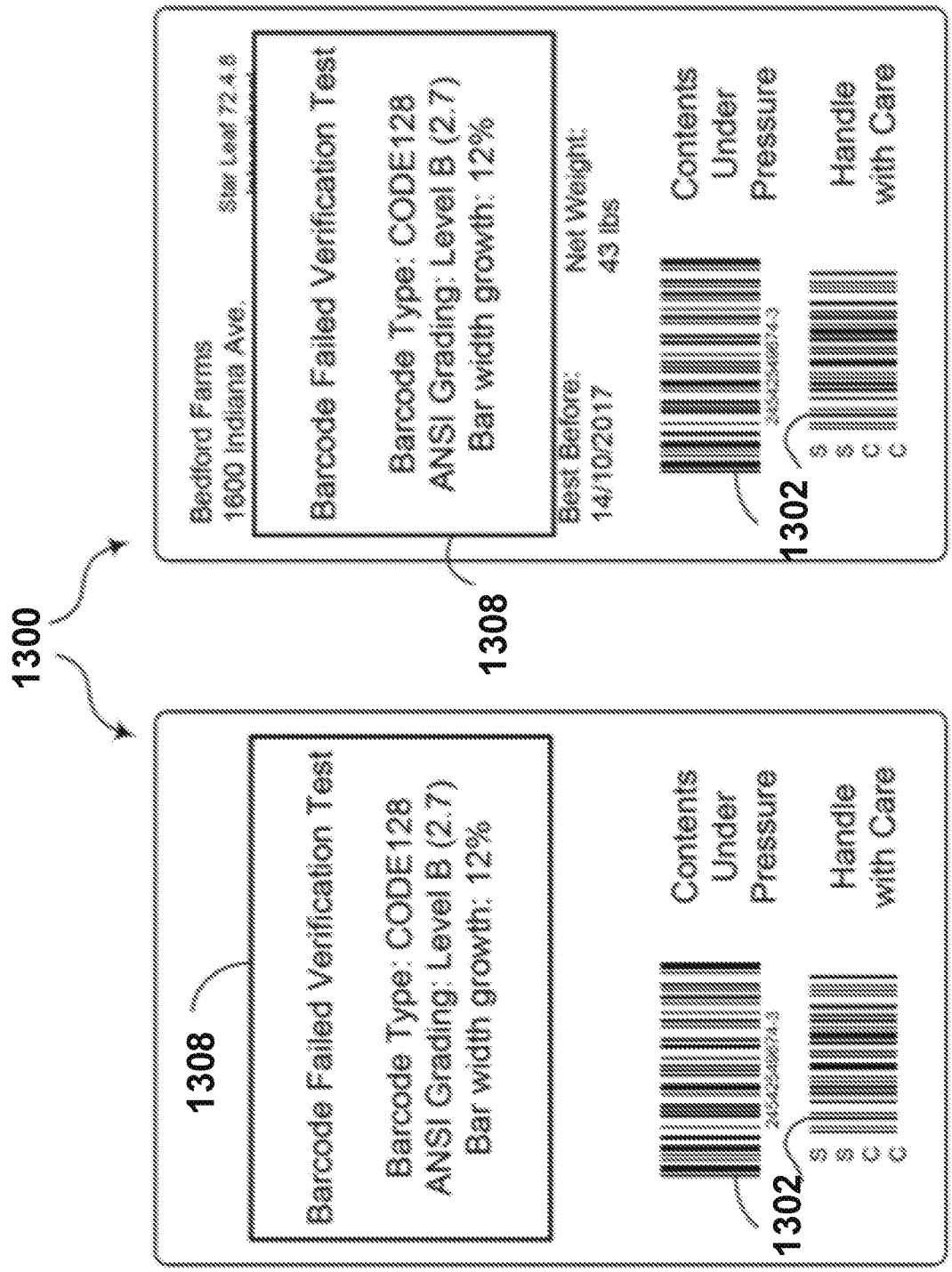

FIG. 13C shows a situation where an error is detected and the image buffer of the printer is replaced with the error message 1308, which may include details of the verification test. For example, the error message 1308 may include a first line that simply states that the barcode has failed a verification test and may read "Barcode Failed Verification Test," "Barcode Verification Failed," "Barcode Failure," or other similar messages.

The next lines of the error message 1308 may include details, such as the barcode type, an ANSI grading, a bar width growth, or other diagnostic information, details, properties, and/or measurements for communicating the issues to the user who may view the defective barcode label 1300. The error message 1308 may be incorporated in a text box. The error message 1308 and/or text box may include a certain level of visibility to show that the regular barcode label 1300 is defective.

The additional information printed in the text box of the error message 1308 can communicate the reason for the print failure. This feedback may be provided by an integrated verifier within a printer. When one of the parameters of the barcode does not meet acceptable thresholds, the printer verification device 1200 can decide whether a barcode label 1300 has failed, and determine whether to print the text box 1308. In this example, a minimum acceptable threshold value for the bar width growth may be 10%, and, as shown in FIG. 13C, the undesirable value of 12% has exceeded the minimum threshold. In this example, the barcode label 1300 is deemed to be defective.

The text box 1308 may include any acceptable form, text font, text size, box design, etc. In some embodiments, the text box 1308 may be a white box with a black outline (having any thickness or design) and the diagnostic information may include black text, as shown in FIGS. 13C and 13D. In other embodiments, the text box 1308 may be a black box with white text inside. The text box 1308 may include other features to highlight or emphasize that the barcode label 1300 is defective.

According to embodiments shown in FIGS. 13C and 13D, the text box 1308 can be considered as an image that replaces the user information 1304 or other regular text that might be printed if no error were detected. In FIG. 13D, the text box 1308 may be incorporated into the image buffer such that it superimposes all or parts of the user information 1304. In some embodiments, the printer control device 1206 may substitute the user information 1304 with a lighter shade of text, and superimpose the error message over the user information 1304. Alternatively, the image buffer of the error message 1308 may completely replace the user information 1304 only where the user information 1304 would have been printed.

According to another embodiment, the printer may print the entire label 1300 but leave the blank area 1306 as shown in FIG. 13B. In this example, the label can be loaded in either direction (i.e., top-end-first or bottom-end-first). The verification process can be conducted to determine if the barcode or barcodes 1302 are defective. If so, the label can be retracted back into the printer so that the error message 1308 can be printed, either in place of the user information 1304 (FIG. 13C) or over the user information 1304 (FIG. 13D).

Alternatively, instead of retracting the label back into the printer, a second printing mechanism can be used for printing the error message 1308 and/or user information 1304. Thus, the image buffer would not be changed on the fly for each specific label, as is done in the embodiments described above. The second printing mechanism may also be configured to print the user information 1304 if no errors are detected, or it may include portions of the user information 1304 outside the text box 1308 if errors are detected.

Figures 14A, 14B:
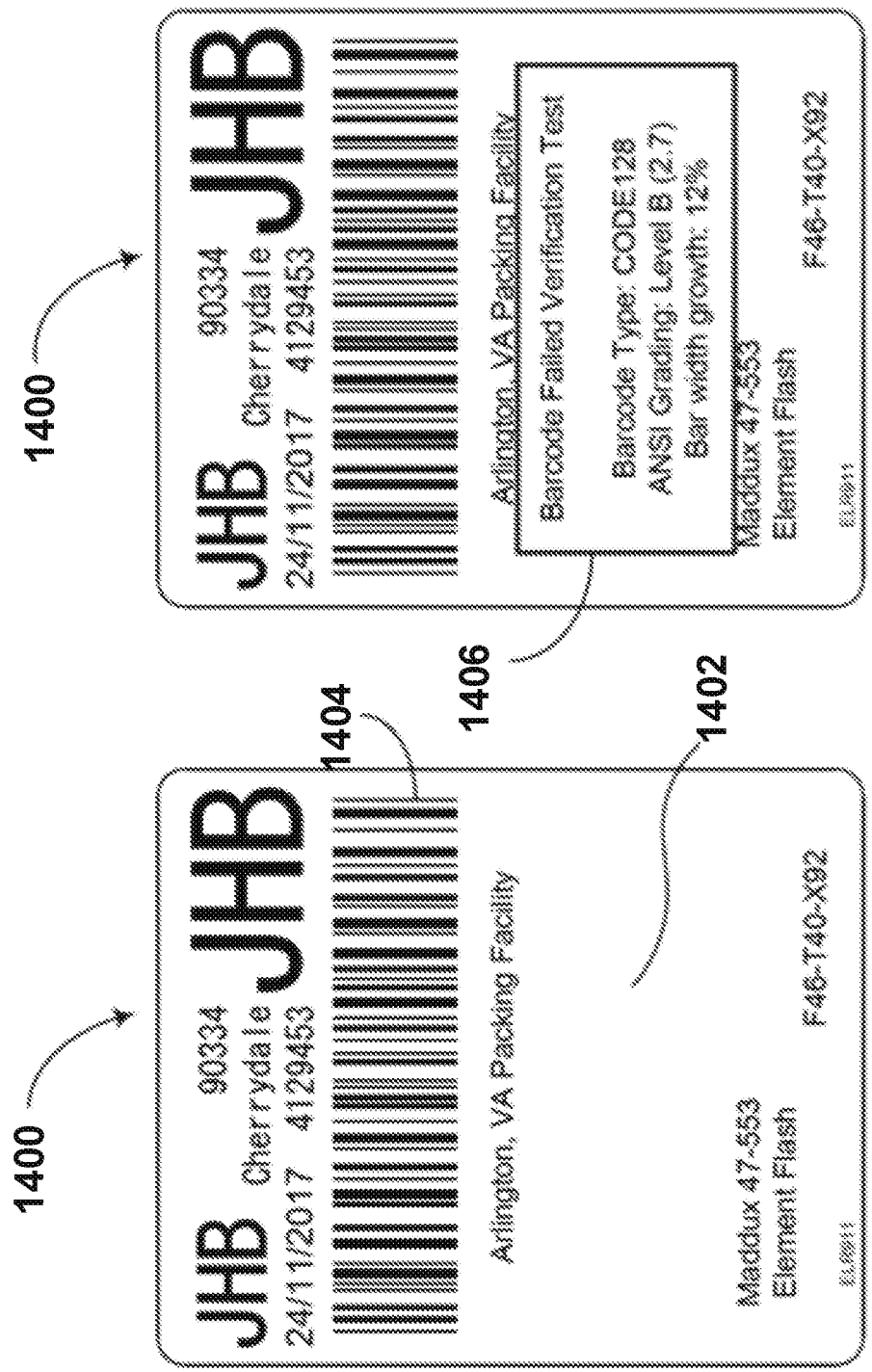
FIGS. 14A, 14B, 14C, and 14D schematically depict views of another exemplary printed label analyzed by a verifying device, according to various embodiments of the present invention.

FIGS. 14A-14D illustrate another exemplary label 1400 to be printed. FIG. 14A shows a view of the label 1400 printed in the manner that is intended. This view also shows what the label 1400 may look like if no errors are detected and no error messages are needed. In this example, the label 1400 may be designed such that it may intentionally or unintentionally include a blank area 1402. In this example, the label may be loaded bottom first into the printer, such that most or all of the label would be printed before the barcode 1404 can be verified. The verifier 1104, print quality monitoring device 1106, and/or sensing device 1202 may be configured to sense the blank area 1402, either by using information from the image buffer or by optically sensing blank areas on the label 1400.

If an error is detected, the label 1400 can be retracted back into the printer so that the error message 1406 (as shown in FIG. 14B) can be printed. The error message 1406 can also be printed by a second printing mechanism to allow the error message to be printed without the need for the retracting action. Either way, the error message 1406 is printed over the top of a label that has already been fully printed or mostly printed. With the location of the blank area 1402 being known, either by an intentional plan or by sensing the blank area 1402, the error message 1406 can be printed in the blank area 1402 with a minimal amount of interference with the above printed text and/or barcodes.

Figures 14C, 14D:

As shown in FIG. 14C, an error message 1408 can be printed with white text on a black background, which may provide greater visibility for a user. Also, in some embodiments, in additional to the error message 1408, the printer may also print void marks over portions of the label. If the error message 1410 is intended to be superimposed over above printed text (as is shown in FIG. 14D), the text of the error message 1410 may be enlarged or bolded to allow a user to read the message even with underlying text. In some embodiments, if a second printing mechanism is used to print an error message over a defective label, the second mechanism may be configured to print the message using a different color of ink (e.g., red), or may be configured to use differing print techniques to emphasize the error message for readability purposes.

Figure 15:
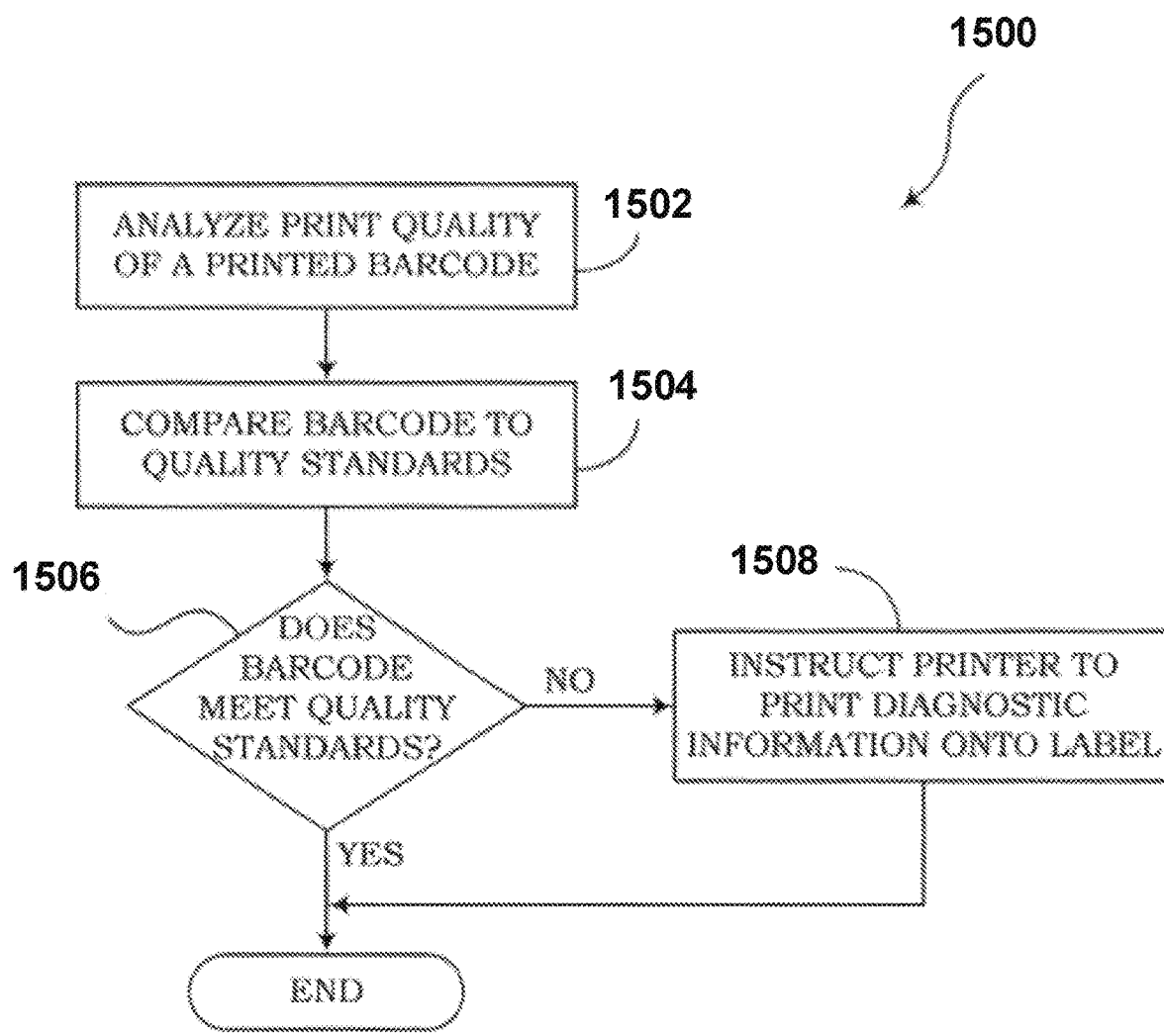
FIG. 15 schematically depicts a flow diagram of a method for providing print verification information, according to various embodiments of the present invention.

FIG. 15 illustrates an exemplary method 1500 for providing print quality feedback. The method 1500, implemented by a printing and verifying apparatus, includes a first step (block 1502) of analyzing the print quality of a printed barcode as described above. As shown in block 1504, the method 1500 further includes comparing the analyzed barcode with certain quality standards, as described above.

As indicated in decision block 1506, the method 1500 includes determining whether the barcode meets the quality standards, as described above. If not, then the method 1500 proceeds to block 1508, which indicates that the method 1500 further includes instructing a printer to print diagnostic information onto a label associated with the barcode. In some embodiments, the printer that prints the diagnostic information is the same printer that prints the defective barcode.

After printing the diagnostic information, the method 1500 ends. If it is determined in decision block 1506 that the barcode meets the quality standards, no further actions are required.

Therefore, according to some embodiments of the present invention, a method may be executed in association with a printer. The method may comprise the steps of analyzing the print quality of a barcode printed by a printing mechanism onto a label (e.g., block 1502), determining if the print quality meets predetermined quality standards (e.g., decision block 1506), and instructing the printing mechanism to print diagnostic information onto the label (e.g., block 1508) if the print quality does not meet the predetermined quality standards.

The diagnostic information associated with block 1508 may include information regarding a level of print quality as described above. For example, the diagnostic information may include gray levels, ANSI grade levels, numeric ANSI grades, and/or bar width growth amounts. The diagnostic information may also include maintenance instructions explaining how to improve or correct the print quality.

III. Additional Implementation Details

In some example embodiments, certain ones of the operations herein may be modified or further amplified as described. Moreover, in some embodiments additional optional operations may also be included. It should be appreciated that each of the modifications, optional additions or amplifications described herein may be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The hardware used to implement the various illustrative logics, logical blocks, modules, and circuits described in connection with the aspects disclosed herein may include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods may be performed by circuitry that is specific to a given function.

In one or more example embodiments, the functions described herein may be implemented by special-purpose hardware or a combination of hardware programmed by firmware or other software. In implementations relying on firmware or other software, the functions may be performed as a result of execution of one or more instructions stored on one or more non-transitory computer-readable media and/or one or more non-transitory processor-readable media. These instructions may be embodied by one or more processor-executable software modules that reside on the one or more non-transitory computer-readable or processor-readable storage media. Non-transitory computer-readable or processor-readable storage media may in this regard comprise any storage media that may be accessed by a computer or a processor. By way of example but not limitation, such non-transitory computer-readable or processor-readable media may include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media may be referred to herein as a computer program product.

It is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A method for controlling a print quality of a machine-readable indicium from a printer, the method comprising:
    capturing an image of the machine-readable indicium;
    evaluating the print quality of the machine-readable indicium from the captured image;
    identifying a print quality problem as a result of the evaluating step;

determining a prescribed corrective action to resolve the print quality problem by retrieving association data that associates different print quality problems with a respective prescribed corrective action, wherein the association data indicates at least one of adjusting a printhead temperature in response to a modulation problem in a picket fence orientation or adjusting a print speed in response to a modulation problem in a ladder orientation;

communicating the prescribed corrective action to a user of the printer;

causing implementation of the prescribed corrective action such that a next machine-readable indicium does not have the print quality problem;

generating data from controlling the print quality of the machine-readable indicium; and at least one of:
 updating the association data with the data, and
 collecting and storing the data for use in printing process control.

2. The method according to claim 1, further comprising repeating the capturing and evaluating steps for each machine-readable indicium.

3. The method according to claim 1, further comprising generating at least one diagnostics report.

4. The method according to claim 1, wherein the machine-readable indicium comprises a printed barcode and evaluating the print quality comprises analyzing one or more barcode quality parameters of the printed barcode from the captured image and comparing results of the analysis against a barcode print quality standard.

5. The method according to claim 4, wherein one of the one or more barcode quality parameters comprises a modulation parameter and identifying the print quality problem comprises identifying a modulation problem in the printed barcode in at least one of the picket fence orientation and the ladder orientation when a modulation grade of the printed barcode fails to meet an acceptable modulation grade according to a printing application requirement.

6. The method according to claim 5, wherein causing the implementation of the prescribed corrective action comprises:
 adjustment of the printhead temperature and the print speed of the printer when the modulation problem of the printed barcode is in both the picket fence orientation and the ladder orientation;
 implementing an adjustment in the printhead temperature when the modulation problem of the printed barcode is in the picket fence orientation only; and
 implementing an adjustment in the print speed when the modulation problem is in the ladder orientation only.

7. The method according to claim 4, wherein one of the one or more barcode quality parameters comprises a defects parameter and identifying the print quality problem comprises identifying defects in the printed barcode and wherein causing the implementation of the prescribed corrective action comprises communication to the user of the printer to change a print media for a next printed barcode.

8. The method according to claim 1, wherein the machine-readable indicium comprises a printed OCR-B character and evaluating the print quality comprises:
 applying a binarization algorithm to the printed OCR-B character; and
 comparing the printed OCR-B character after application of the binarization algorithm to a print quality standard.

9. The method according to claim 8, wherein identifying the print quality problem comprises identifying the print quality problem in the printed OCR-B character by non-conformity of the printed OCR-B character with a Stroke Width Template described in ISO/IEC standard 30116.

10. The method according to claim 9, wherein causing the implementation of the prescribed corrective action comprises implementing an adjustment in at least one of the print speed and the printhead temperature if the printed OCR-B character does not conform with the Stroke Width Template by exceeding or being short of an outer character boundary of the Stroke Width Template and by communication to the user of the printer to change a print media for a next printed OCR-B character if the printed OCR-B character does not conform with the Stroke Width Template by having defects therein.

11. The method according to claim 1, wherein the machine-readable indicium once captured comprises a first captured image, the method further comprising:
 capturing the image of the next machine-readable indicium from the same printer to obtain a second captured image;
 evaluating the print quality of the next machine-readable indicium from the second captured image; and
 verifying, after the prescribed corrective action has been implemented, that the next machine-readable indicium does not have the print quality problem, thereby determining that the prescribed corrective action resolved the print quality problem.

12. A method for controlling print quality of a printed barcode from a printer, the method comprising:
 capturing an image of the printed barcode from the printer to obtain a captured image, the printed barcode formatted in a picket fence orientation and in a ladder orientation;
 evaluating a print quality of the printed barcode;
 identifying, as a result of the evaluating step, a modulation problem in at least one of the picket fence orientation or the ladder orientation of the printed barcode;
 determining a prescribed corrective action for improving a modulation grade of the printed barcode, wherein the prescribed corrective action comprises at least one of adjusting a printhead temperature in response to the modulation problem in the picket fence orientation or adjusting a print speed in response to the modulation problem in the ladder orientation;
 communicating the prescribed corrective action to a user of the printer; and
 causing adjustment of the printer to implement the prescribed corrective action to improve the modulation grade of a next printed barcode.

13. The method according to claim 12, further comprising repeating the capturing and evaluating steps for each printed barcode.

14. The method according to claim 12, wherein evaluating the print quality comprises analyzing one or more barcode quality parameters of the printed barcode from the captured image and comparing results of the analysis against a barcode print quality standard.

15. The method according to claim 14, wherein one of the one or more barcode quality parameters comprises a modulation parameter, and wherein:
 identifying the modulation problem in both the picket fence orientation and the ladder orientation of the printed barcode comprises identifying that the modulation grade of the printed barcode in the picket fence orientation and in the ladder orientation fails to meet an acceptable modulation grade according to a printing application requirement; and determining the prescribed corrective action comprises retrieving association data that specifically associates the modulation problem in both the picket fence orientation and the ladder orientation with the prescribed corrective action.

16. The method according to claim 12, wherein causing adjustment of the printer to implement the prescribed corrective action comprises adjusting the printhead temperature for the next printed barcode in the picket fence orientation and adjusting the print speed of the printer for the next printed barcode in the ladder orientation.

17. The method according to claim 12, wherein the printed barcode comprises one of:
- on the same print medium, a first one-dimensional printed barcode in the picket fence orientation and a second one-dimensional printed barcode in the ladder orientation, the modulation problem identified in both the first one-dimensional printed barcode and the second one-dimensional printed barcode; or
- a two-dimensional barcode.

18. An apparatus comprising at least one processor and at least one non-transitory memory comprising program code, the at least one non-transitory memory and the program code configured to, with the at least one processor, cause the apparatus to:
- identify a print quality problem based at least in part on evaluating a print quality of a machine-readable indicium from a captured image;
- determine a prescribed corrective action to resolve the print quality problem by retrieving association data that associates different print quality problems with a respective prescribed corrective action, wherein the association data indicates adjusting a printhead temperature in response to a modulation problem in a picket fence orientation or adjusting a print speed in response to a modulation problem in a ladder orientation;
- communicate the prescribed corrective action to a user;
- cause implementation of the prescribed corrective action such that a next machine-readable indicium does not have the print quality problem;
- generate data from controlling the print quality of the machine-readable indicium; and
- at least one of:
  - update the association data with the data, and
  - collect and storing the data for use in printing process control.

19. The apparatus of claim 18, wherein the machine-readable indicium comprises a printed barcode, wherein, when evaluating the print quality, the at least one non-transitory memory and the program code are configured to, with the at least one processor, cause the apparatus to:
- analyze one or more barcode quality parameters of the printed barcode from the captured image; and
- compare results of the analysis against a barcode print quality standard.

20. The method of claim 1, wherein the data from controlling the print quality of the machine-readable indicium indicates the implementation of the prescribed corrective action in response to the print quality problem.

* * * * *